US012610149B2

(12) United States Patent
Luo

(10) Patent No.: US 12,610,149 B2
(45) Date of Patent: Apr. 21, 2026

(54) IMAGE SENSOR, CONTROL METHOD, CONTROL APPARATUS, ELECTRONIC DEVICE, AND STORAGE MEDIUM

(71) Applicant: VIVO MOBILE COMMUNICATION CO., LTD., Dongguan (CN)

(72) Inventor: Yi Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 170 days.

(21) Appl. No.: 18/586,105

(22) Filed: Feb. 23, 2024

(65) Prior Publication Data

US 2024/0196103 A1     Jun. 13, 2024

Related U.S. Application Data

(63) Continuation of application No. PCT/CN2022/114701, filed on Aug. 25, 2022.

(30) Foreign Application Priority Data

Aug. 25, 2021     (CN) .......................... 202110984568.1

(51) Int. Cl.
H04N 23/84          (2023.01)
H04N 23/12          (2023.01)
H04N 25/77          (2023.01)

(52) U.S. Cl.
CPC ............. H04N 23/84 (2023.01); H04N 23/12 (2023.01); H04N 25/77 (2023.01)

(58) Field of Classification Search
None
See application file for complete search history.

(56) References Cited

U.S. PATENT DOCUMENTS

| | | | | |
|---|---|---|---|---|
| 7,554,587 B2 * | 6/2009 | Shizukuishi | ......... | H04N 25/133 |
| | | | | 348/272 |
| 7,745,779 B2 * | 6/2010 | Conners | ............... | H04N 25/778 |
| | | | | 257/432 |
| 9,648,267 B2 | 5/2017 | Okamoto et al. | | |
| 12,120,449 B2 | 10/2024 | Asakura | | |

(Continued)

FOREIGN PATENT DOCUMENTS

| | | |
|---|---|---|
| CN | 101171830 A | 4/2008 |
| CN | 105430362 A | 3/2016 |

(Continued)

*Primary Examiner* — James M Hannett
(74) *Attorney, Agent, or Firm* — The Webb Law Firm

(57) ABSTRACT

An image sensor includes a pixel circuit array, where the pixel circuit array includes a plurality of pixel cluster circuits. Each of the pixel cluster circuits includes one white pixel circuit and at least two color pixel circuits, and the at least two color pixel circuits are disposed around the white pixel circuit. The pixel circuit array includes at least two pixel circuit rows and at least two pixel circuit columns. The at least two pixel circuit rows share one control signal line, and the at least two pixel circuit columns share one output signal line, where the pixel circuit row includes the white pixel circuit or the color pixel circuit. The pixel circuit column includes the white pixel circuit or the color pixel circuit; and a pixel signal processing module, where the pixel signal processing module is connected to the output signal line.

18 Claims, 10 Drawing Sheets

(56)     References Cited

U.S. PATENT DOCUMENTS

2006/0165179 A1      7/2006   Feuer et al.
2006/0231734 A1     10/2006   Shaw
2006/0256221 A1     11/2006   Mckee et al.
2009/0033779 A1      2/2009   Mo
2009/0140124 A1*     6/2009   Kanai ................. H04N 25/534
                                                         250/226
2009/0200451 A1      8/2009   Conners
2010/0214462 A1      8/2010   Itakura
2011/0155892 A1      6/2011   Neter et al.
2014/0009647 A1      1/2014   Hayashi et al.
2014/0104465 A1      4/2014   Yamashita
2016/0373680 A1     12/2016   Shimokura
2018/0007324 A1*     1/2018   Chen ..................... H04N 23/54
2019/0182465 A1      6/2019   Kawano et al.
2022/0232184 A1*     7/2022   Lee ................... H10F 39/8057

FOREIGN PATENT DOCUMENTS

CN          105578066  A      5/2016
CN          108305883  A      7/2018
CN          108462841  A      8/2018
CN          109257548  A      1/2019
CN          111614886  A      9/2020
CN          112822466  A      5/2021
CN          113676651  A     11/2021
CN          113676652  A     11/2021
EP            1176807  A1     1/2002
JP          2004289444 A     10/2004
JP          2013186294 A      9/2013
JP           201417615 A      1/2014
WO          2013164961 A1    11/2013
WO          2020153123 A1     7/2020

* cited by examiner

1402

1400

1500

1502        1504

1

IMAGE SENSOR, CONTROL METHOD, CONTROL APPARATUS, ELECTRONIC DEVICE, AND STORAGE MEDIUM

CROSS-REFERENCE TO RELATED APPLICATIONS

This application is a Bypass Continuation Applications of International Patent Application No. PCT/CN2022/114701, filed Aug. 25, 2022, and claims priority to Chinese Patent Application No. 202110984568.1, filed Aug. 25, 2021, the disclosures of which are hereby incorporated by reference in their entireties.

BACKGROUND OF THE INVENTION

Field of the Invention

This application pertains to the field of electronic device technologies, and relates to an image sensor, a control method, a control apparatus, an electronic device, and a storage medium.

Description of Related Art

Currently, inspired by the light emitting diode (LED) display technology, a five-pixel color filter array (CFA), namely RGBW3.0, has been developed, which addresses many disadvantages (for example, decreased color resolution) found in application of the conventional CFA architectures, such as Kodak RGBW CFA and Bayer RGB CFA. However, the structure of RGBW3.0 has undergone major changes compared to the conventional CFA architectures, and currently, there is no corresponding pixel signal processing circuit scheme for the pixel array, resulting in the inability to accurately control RGBW3.0.

SUMMARY OF THE INVENTION

Embodiments of this application provide an image sensor, a control method, a control apparatus, an electronic device, and a storage medium.

According to a first aspect, an embodiment of this application provides an image sensor, where the image sensor includes:

a pixel circuit array, where the pixel circuit array includes a plurality of pixel cluster circuits, each of the pixel cluster circuits includes one white pixel circuit and at least two color pixel circuits, and the at least two color pixel circuits are disposed around the white pixel circuit; and the pixel circuit array includes at least two pixel circuit rows and at least two pixel circuit columns, the at least two pixel circuit rows share one control signal line, and the at least two pixel circuit columns share one output signal line, where the pixel circuit row includes the white pixel circuit or the color pixel circuit, and the pixel circuit column includes the white pixel circuit or the color pixel circuit; and a pixel signal processing module, where the pixel signal processing module is connected to the output signal line.

According to a second aspect, an embodiment of this application provides an electronic device, where the electronic device includes the image sensor according to the first aspect.

According to a third aspect, an embodiment of this application provides an image sensor control method, where an image sensor includes a pixel circuit array and a pixel signal processing module; the pixel circuit array includes a plurality of pixel cluster circuits, each of the pixel cluster circuits includes one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line; and the pixel signal processing module is connected to the output signal line; in a case that the pixel circuit row includes the white pixel circuit or the color pixel circuit and that the pixel circuit column includes the white pixel circuit or the color pixel circuit, the pixel signal processing module includes a selection module, a first processing sub-module, a second processing sub-module, and a first processing buffer module; and the control method includes:

controlling the selection module to transmit a first target signal to the first processing sub-module;

controlling the first processing sub-module to perform amplification and analog-to-digital conversion processing on the first target signal, and controlling the second processing sub-module to perform amplification processing on a third output signal of a third output signal line and to perform analog-to-digital conversion processing on the third output signal obtained after amplification processing; and controlling the first processing buffer module to store the first target signal and the third output signal, and to perform image processing on the first target signal and the third output signal; where the first target signal includes a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column including the white pixel circuit, and the color pixel circuit column is a pixel circuit column including the color pixel circuit.

According to a fourth aspect, an embodiment of this application provides an image sensor control apparatus, where an image sensor includes a pixel circuit array and a pixel signal processing module. The pixel circuit array includes a plurality of pixel cluster circuits, each of the pixel cluster circuits includes one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line. The pixel signal processing module is connected to the output signal line; in a case that the pixel circuit row includes the white pixel circuit or the color pixel circuit and that the pixel circuit column includes the white pixel circuit or the color pixel circuit, the pixel signal processing module includes a selection module, a first processing sub-module, a second processing sub-module, and a first processing buffer module. The control apparatus is configured to:

control the selection module to transmit a first target signal to the first processing sub-module;

control the first processing sub-module to perform amplification and analog-to-digital conversion processing on the first target signal, and control the second processing sub-module to perform amplification processing on a third output signal of a third output signal line and to perform analog-to-digital conversion processing on the third output signal obtained after amplification processing; and control the first processing buffer module to store the first target signal and the third output signal, and to perform image processing on the first target signal and the third output signal; where the first target signal includes a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column including the white pixel circuit, and the color pixel circuit column is a pixel circuit column including the color pixel circuit.

According to a fifth aspect, an embodiment of this application provides an electronic device, where the electronic device includes a processor, a memory, and a program or instructions stored in the memory and capable of running on the processor, and when the program or the instructions are executed by the processor, the steps of the method according to the second aspect are implemented.

According to a sixth aspect, an embodiment of this application provides a non-transitory readable storage medium, where the non-transitory readable storage medium stores a program or instructions, and when the program or the instructions are executed by a processor, the steps of the method according to the second aspect are implemented.

According to a seventh aspect, an embodiment of this application provides a chip, where the chip includes a processor and a communications interface, the communications interface is coupled to the processor, and the processor is configured to run a program or instructions to implement the method according to the second aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, in the specification and claims, "and/or" represents presence of at least one of connected objects, and the symbol "/" in this specification usually indicates an "or" relationship between associated objects.

Figure 1:
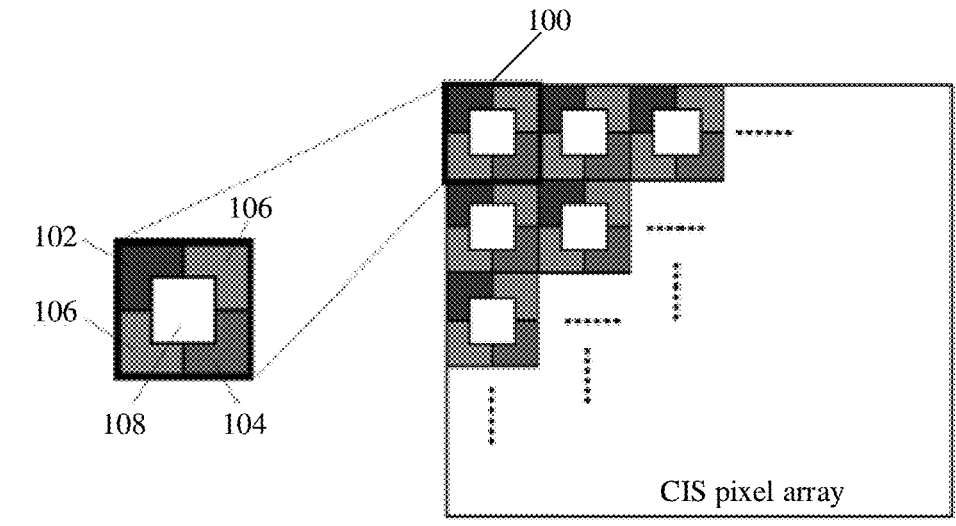
FIG. 1 is a schematic diagram of a pixel array layout and a pixel cluster layout of a complementary metal-oxide semiconductor image sensor according to an embodiment of this application.

A pixel array of a CIS using RGBW3.0 includes pixel clusters. As shown in FIG. 1, each pixel cluster 100 has five pixels, of which four are color pixels, including a red pixel 102, a blue pixel 104 and two green pixels 106, all of which are "L"-shaped, while a colorless and transparent white pixel 108 is still square. The white pixel 108 is located in the center of the pixel cluster 100 and is surrounded by the four "L"-shaped color pixels. Under a color filter of each color pixel is a photosensitive element, such as a photodiode, and the function of the photosensitive element is to convert light filtered by the color filter into an electrical signal, such as current, voltage, and electrical potential energy, for back-end processing.

Figure 2:
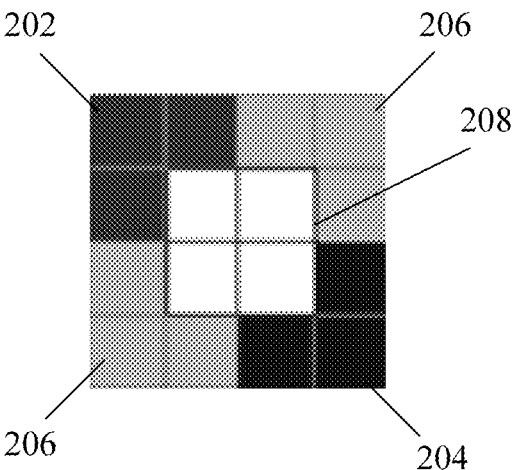
FIG. 2 is a first schematic structural diagram of pixels of a complementary metal-oxide semiconductor image sensor according to an embodiment of this application.
Figure 3:
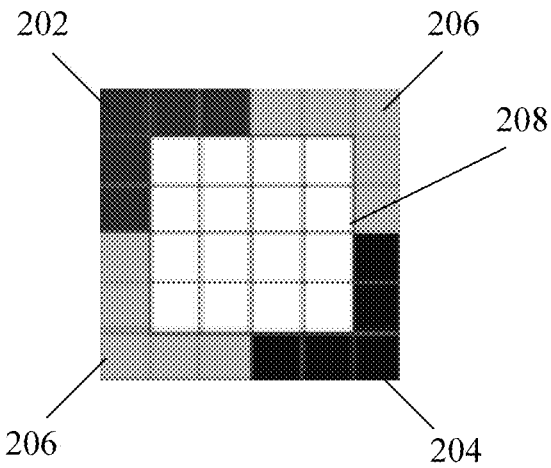
FIG. 3 is a second schematic structural diagram of pixels of a complementary metal-oxide semiconductor image sensor according to an embodiment of this application.

In modern CIS manufacturing processes, special-shaped pixels (that is, "L"-shaped) are still unable to be widely used in consumer CIS products due to process and yield issues. In order to achieve successful practice, the "L"-shaped color pixels in RGBW3.0 are split into a plurality of rectangular pixels. As shown in FIG. 2 and FIG. 3, there are two schemes. As shown in FIG. 2, in scheme 1, the red region 202, the blue region 204, and the green region 206 each include three pixels. The white region 208 in the center includes four pixels, and each pixel has a same size. As shown in FIG. 3, in scheme 2, each color region includes 5 pixels, and the white region 208 in the center includes 16 pixels. Regardless of the above method, a ratio of the number of green pixels, red pixels, and blue pixels remains unchanged and is always 2:1:1. However, due to the change in the number of white pixels, a proportion of the white region in the pixel cluster region changes. In scheme 1, a ratio of white pixels to color pixels is 1:3, and in scheme 2, a ratio of white pixels to color pixels is 4:5.

Figure 4:
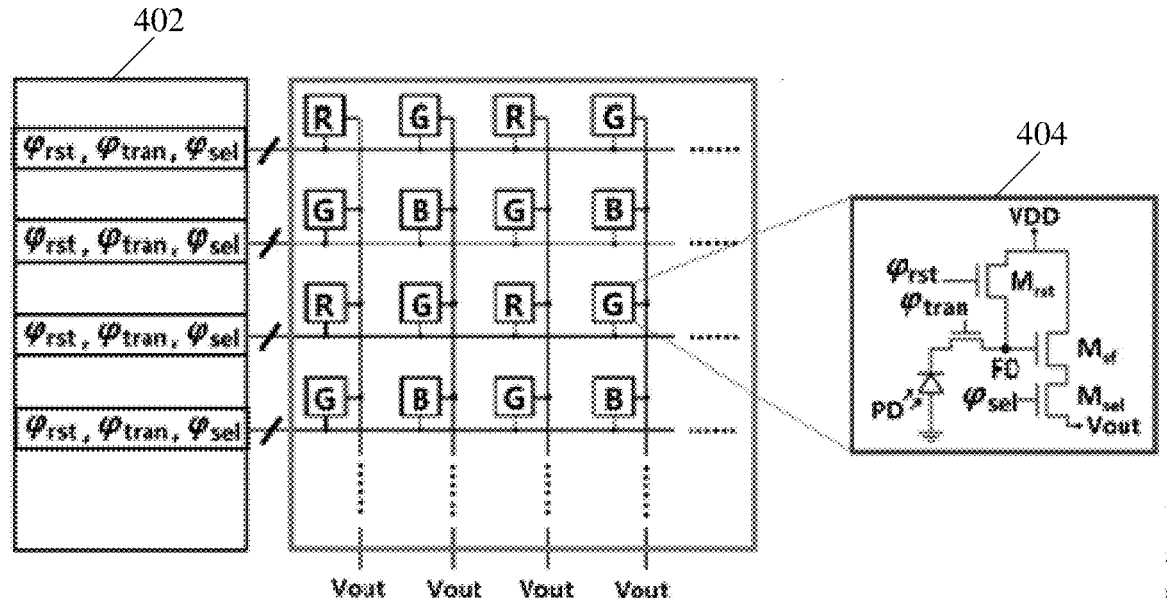
FIG. 4 is a schematic architecture diagram of a pixel circuit array architecture of a complementary metal-oxide semiconductor image sensor according to an embodiment of this application.

A CIS pixel circuit array architecture using RGBW3.0 is shown in FIG. 4. Each row of pixels shares a set of pixel control signals. The pixel control signals include: a pixel reset signal ($\varphi$rst) for controlling a pixel reset time, a charge transfer switch signal ($\varphi$tran) for controlling a pixel exposure time, and a pixel signal read switch signal ($\varphi$sel) for controlling a pixel read time. The pixel control signal is generated by the pixel control signal generation module 402. Pixels in each column share one pixel output signal (Vout) transmission line, and pixels in each row take turns using the shared transmission line to transmit Vout to a back-end signal processing circuit.

For each pixel, one pixel circuit is included. As shown in FIG. 4, the pixel circuit 404 includes a 4-transistor active pixel sensor (APS) circuit, where a light-sensitive photodiode (PD) converts light into electrons, which are then transferred through a charge transfer transistor (whose switch is controlled by $\varphi$tran) to a floating diffusion (FD) region. When a pixel is selected for readout ($\varphi$sel level being raised), the charge in FD is read as a voltage signal by a source follower composed of Msf and Msel and is output as Vout.

The RGBW3.0 CFA being used cannot be applied to pixel signal processing circuits corresponding to the conventional pixel arrays because the structure of the RGBW3.0 CFA has changed significantly compared with conventional CFA forms such as Bayer RGB and Kodak RGBW. The image sensor and electronic device provided in this application are capable of resolving the above problems.

The following describes an image sensor, a control method, a control apparatus, an electronic device, and a storage medium provided in the embodiments of this application by using some embodiments and application scenarios thereof with reference to the accompanying drawings.

An embodiment of this application provides an image sensor, and the image sensor includes:

a pixel circuit array, where the pixel circuit array includes a plurality of pixel cluster circuits, each of the pixel cluster circuits includes one white pixel circuit and at least two color pixel circuits, and the at least two color pixel circuits are disposed around the white pixel circuit; and the pixel circuit array includes at least two pixel circuit rows and at least two pixel circuit columns, the at least two pixel circuit rows share one control signal line, and the at least two pixel circuit columns share one output signal line, where the pixel circuit row includes the white pixel circuit or the color pixel circuit, and the pixel circuit column includes the white pixel circuit or the color pixel circuit; and a pixel signal processing module, where the pixel signal processing module is connected to the output signal line.

In this embodiment, for a scheme with the "L"-shaped pixel structure, a CFA of the pixel layer adopts a layout shown in FIG. 1. Each pixel cluster includes four color pixels and one white pixel. The four color pixels include a red pixel (R), a blue pixel (B), and two green pixels (G), all being "L"-shaped. A colorless and transparent white pixel (W) is square, and the white pixel is located in the center of the pixel cluster and is surrounded by the four "L"-shaped color pixels.

Figure 5:
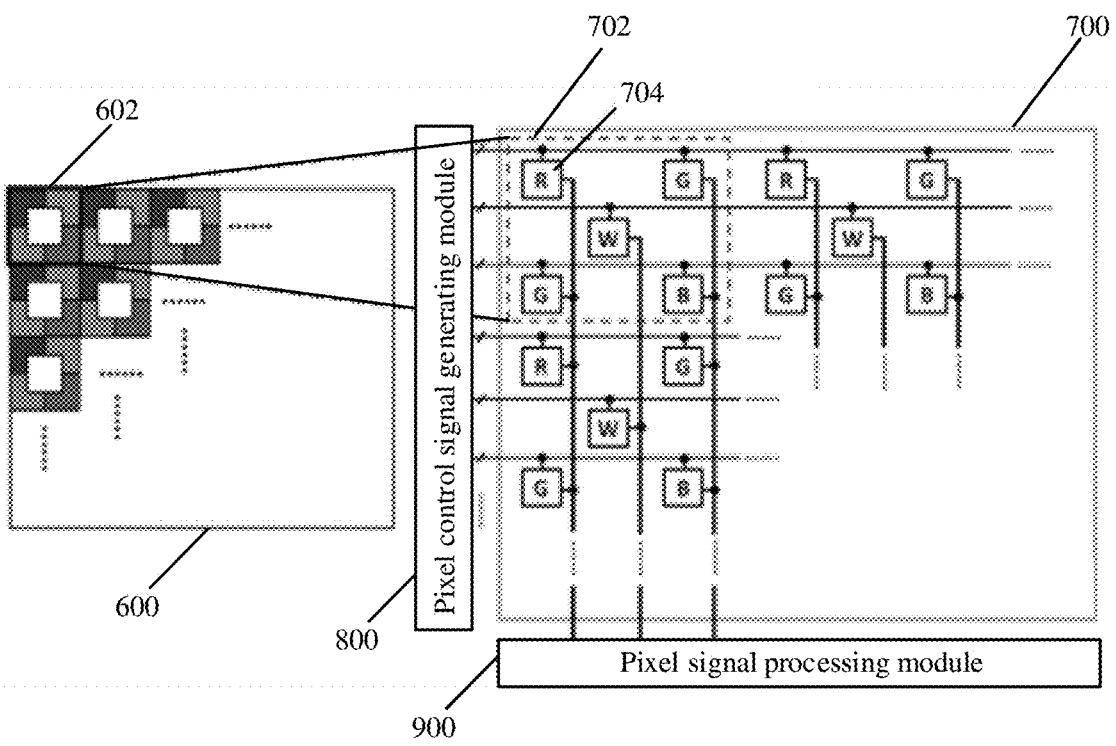
FIG. 5 is a first schematic structural diagram of a pixel circuit array according to an embodiment of this application.

A pixel array 600 and a circuit structure of a pixel circuit array 700 corresponding to the pixel array 600 are shown in FIG. 5. The pixel circuit array 700 includes a plurality of pixel cluster circuits 702, and one pixel cluster circuit 702 includes a plurality of pixel circuits 704 (one pixel cluster 602 in the pixel array 600 corresponds to one pixel cluster circuit 702, and one pixel in pixel array 600 corresponds to one pixel circuit 704), and each row of pixel circuits is controlled by a pixel control signal generation module 800.

The pixel circuit row includes a white pixel circuit or a color pixel circuit, and the pixel circuit column includes a white pixel circuit or a color pixel circuit, which is equivalent to that each pixel circuit row in the pixel circuit array shares one control signal line and each pixel circuit column in the pixel circuit array shares one output signal line, which includes: color pixel circuits in each row share one pixel control signal (that is, a control signal line) and white pixel circuits in each row share one pixel control signal; color pixel circuits in each column share one output signal line and white pixel circuits in each column share one output signal line. The pixel control signal shared by the white pixel circuits in each row is independent of the pixel control signal shared by the color pixel circuits in each row, and the output signal line of the color pixel circuits is independent of the output signal line of the white pixel circuits. An output voltage signal of each column of color pixel circuits is Vout and an output voltage signal of each column of white pixel circuits is Vout_w. A signal transmission line transmits output signals (Vout and Vout_w) of each column to a pixel signal processing module 900, and the pixel signal processing module 900 performs processing on the output signals.

The embodiments of this application provide an RGBW pixel circuit array architecture to implement a new layout of the pixel circuit array with respect to conventional pixel circuit arrays. On the one hand, this pixel circuit array architecture is applicable to CFAs (for example, RGBW3.0 CFA), which resolves the problem that the CFA cannot use conventional pixel circuit arrays, and provides a basis for wide application of the CFA in CISs; on the other hand, independent signal processing is implemented for the color pixels and the white pixels, which effectively avoids crosstalk of signals between the color pixels and the white pixels while adapting to adopt the pixel structure of the CFA, and improves sensitivity of the image sensors.

Optionally, in an embodiment of this application, the pixel signal processing module includes: a plurality of selection modules, where the selection module is connected to a first output signal line and a second output signal line, where the first output signal line is an output signal line corresponding to a white pixel circuit column, the second output signal line is an output signal line corresponding to one color pixel circuit column adjacent to the white pixel circuit column, the white pixel circuit column is a pixel circuit column including the white pixel circuit, and the color pixel circuit column is a pixel circuit column including the color pixel circuit; a first processing module, where the first processing module includes: a plurality of first processing sub-modules, where the first processing sub-module is connected to the selection module; and a plurality of second processing sub-modules, where the second processing sub-module is connected to a third output signal line, and the third output signal line is an output signal line corresponding to another color pixel circuit column adjacent to the white pixel circuit column; and a first processing buffer module, connected to the first processing module.

The selection module transmits a first output signal of the first output signal line or a second output signal of the second output signal line to the first processing sub-module. The first processing sub-module performs amplification processing on the first output signal or the second output signal, and performs analog-to-digital conversion processing on the first output signal or second output signal obtained after amplification processing. The second processing sub-module is configured to perform amplification processing on a third output signal of the third output signal line, and performs analog-to-digital conversion processing on the third output signal obtained after amplification processing. The first processing buffer module is configured to store the first output signal, the second output signal, and the third output signal, and to perform image processing on the first output signal, the second output signal, and the third output signal that are stored, so as to improve signal quality of the first output signal, the second output signal, and the third output signal. Image processing includes post-processing such as linearity correction, bad point removal, interpolation, white balance, and automatic exposure control.

In this embodiment, the pixel signal processing module includes a plurality of selection modules, a first processing module, and a first processing buffer module. The first processing module includes a plurality of first processing sub-modules and a plurality of second processing sub-modules. An output signal of an output signal line (that is, the first output signal line) corresponding to the white pixel circuit column and an output signal of an output signal line (that is, the second output signal line) corresponding to one color pixel circuit column adjacent to the white pixel circuit column are multiplexed into one first processing sub-module through one selection module. However, an output signal of an output signal line (that is, the third output signal line) corresponding to another color pixel circuit column adjacent to the first output signal line uses the second processing sub-module.

The first processing buffer module is connected to all of the first processing sub-modules and all of the second processing sub-modules, and is configured to sequentially store and perform image processing on the first output signal, the second output signal, and the third output signal that are obtained after amplification processing and analog-to-digital conversion processing.

Figure 6:
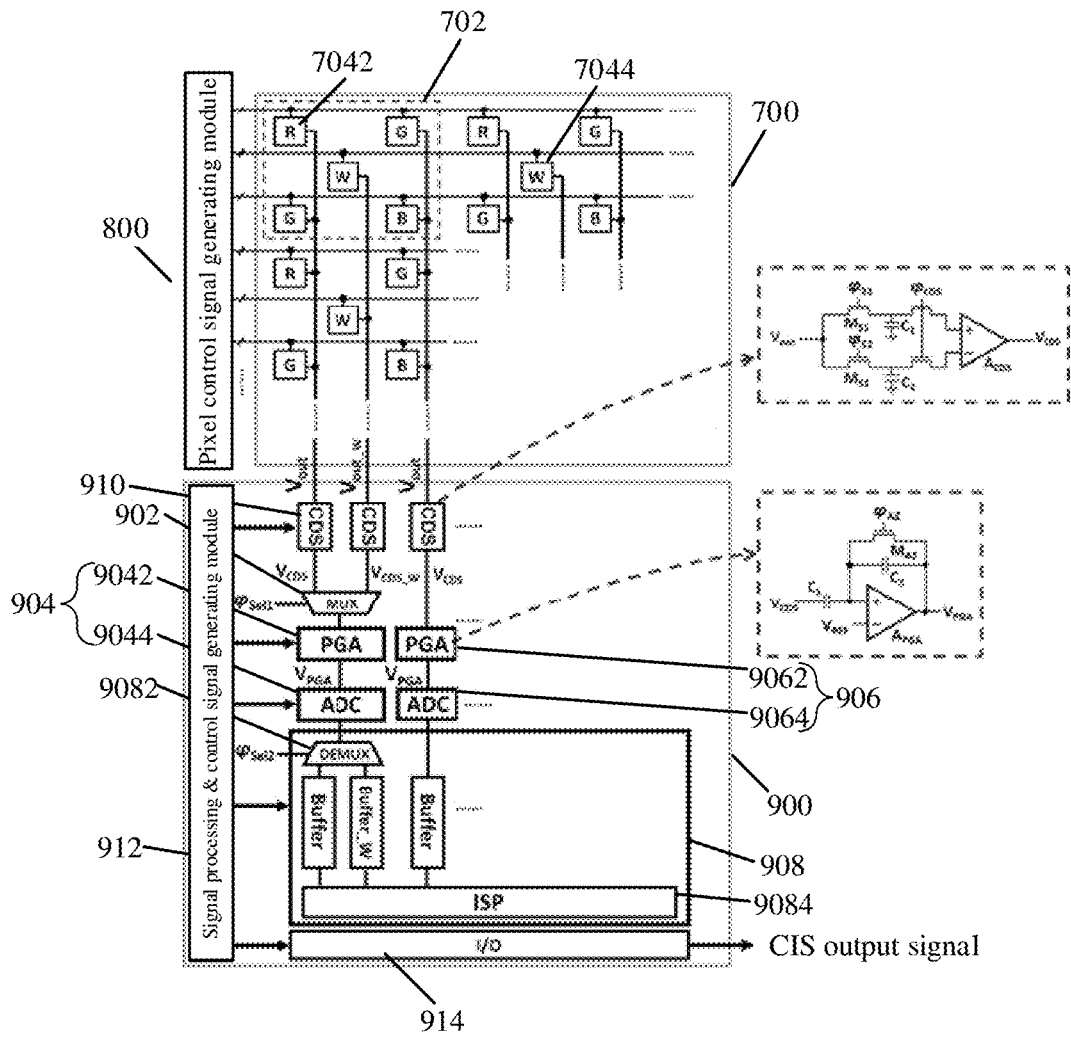
FIG. 6 is a first schematic structural diagram of a pixel signal processing module according to an embodiment of this application.

For example, as shown in FIG. 6, the pixel signal processing module 900 includes an analog data multiplexer (MUX) 902, a first processing sub-module 904, a second processing sub-module 906, and a first processing buffer module 908. An output signal of each column of color pixel circuits 7042 is Vout, an output signal of each column of white pixel circuits 7044 is Vout_w, and one output signal Vout and one output signal Vout_w pass through one MUX 902 and are then multiplexed into one first processing sub-module 904. The MUX is the foregoing selection module. The first processing sub-module 904 includes one programmable gain amplifier (PGA) circuit 9042 and one analog-to-digital converter (ADC) circuit 9044, and the second processing sub-module 906 includes one PGA circuit 9062 and one ADC circuit 9064. The PGA circuit is configured to perform amplification processing on a signal, and its output signal VPGA is then input to the ADC circuit. The ADC circuit is configured to perform analog-to-digital conversion processing on the signal VPGA. The first processing buffer module 908, namely an ISP and an image buffer, is configured to store and perform image processing on signals.

It should be noted that, as shown in FIG. 6, two input signals of the MUX 902 are an output signal Vout_w of one white pixel circuit column in a row of pixel cluster circuits and an output signal Vout of any one color pixel circuit column in the row of pixel cluster circuits.

In a case that signals of the pixel circuits are read in a row-by-row scanning manner, the first row of pixels is read first, for example, a signal of a color pixel R and a signal of a color pixel G are read. The signal of the color pixel R is transmitted to the MUX 902 and then to the PGA circuit and the ADC circuit for processing, and the signal of the color pixel G is transmitted directly to the PGA circuit and the ADC circuit for processing. Then, the second row of pixels are read, for example, a signal of a white pixel W is read. The signal of the white pixel W is transmitted to the MUX 902 and then to the PGA circuit and the ADC circuit, which are the same PGA circuit and the ADC circuit as the signal of the color pixel R. Because the first row of pixels and the second row of pixels are not read simultaneously, there is no processing conflict for the PGA circuit and ADC circuit.

In the embodiments of this application, because the white pixels and the color pixels are different in quantity and located in different horizontal rows, some sub-modules may be used by both the signal processing link of the white pixels and the color pixel processing link, thereby saving space and energy consumption.

Optionally, in an embodiment of this application, the first processing buffer module includes: a plurality of first demultiplexing modules, where the first demultiplexing module is connected to the first processing sub-module; a plurality of first buffer modules, where the first buffer module is connected to the first demultiplexing module; a plurality of second buffer modules, where the second buffer module is connected to the first demultiplexing module or the second buffer module is connected to the second processing sub-module; and a first image processing module, connected to the first buffer module and the second buffer module.

The first buffer module is configured to store the first output signal. The second buffer module is configured to store the second output signal in a case of being connected to the first demultiplexing module, and the second buffer module is configured to store the third output signal in a case of being connected to the second processing sub-module. The first image processing module is configured to perform image processing on the first output signal, the second output signal, and the third output signal.

In this embodiment, the first processing buffer module includes a plurality of first demultiplexing modules, a plurality of first buffer modules, a plurality of second buffer modules, and the first image processing module. The first demultiplexing module is configured to transmit the first output signal and the second output signal output from the first processing sub-module to different buffer modules. Optionally, the first output signal is transmitted to the first buffer module, the second output signal is transmitted to the second buffer module, and the third output signal is transmitted to the second buffer module. In other words, the output signal of the white pixel circuit column is stored in the first buffer module, and the output signals of the color pixel circuit column are stored in the second buffer module.

The first image processing module then performs image processing on the signals stored in the first buffer module and the second buffer module.

It should be noted that the number of the plurality of first demultiplexing modules is equal to the number of selection modules.

For example, as shown in FIG. 6, after entering the first processing buffer module 908, the first output signal and the second output signal are stored into different buffer modules (Buffer and Buffer_W) through the digital data demultiplexer (DEMUX) 9082 of the first processing buffer module 908, where the DEMUX is the first demultiplexing module. Optionally, the second output signal and the third output signal (that is, the output signal of the color pixel column) are buffered in the Buffer, and the first output signal (that is, the output signal of the white pixel column) is buffered in the Buffer_W. The buffered signals then enter the ISP 9084 for digital image processing and other related steps.

In the above manner, the output signal of the color pixel column and the output signal of the white pixel column are buffered independently, and the first image processing module may randomly select the output signal of the color pixel column or the output signal of the white pixel column for post-processing, greatly enriching the types of image signal processing.

Figure 8:
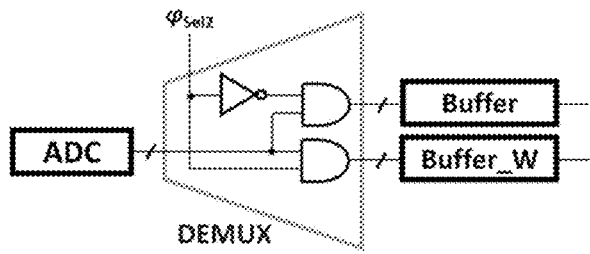
FIG. 8 is a schematic structural diagram of a digital data demultiplexer according to an embodiment of this application.

It should be noted that the circuit structure of the DEMUX 9082 is shown in FIG. 8, and the DEMUX 9082 is controlled by the φSel2 signal to input the output signals of the ADC separately to the Buffer and the Buffer_W.

Common buffer modules are dynamic random access memory (DRAM), static random access memory (SRAM), and so on.

The data demultiplexer in FIG. 6 may alternatively be placed in front of the ADC; in this case, the data demultiplexer then needs to use an analog data demultiplexer instead of a digital data demultiplexer.

Optionally, in an embodiment of this application, the pixel signal processing module further includes: a plurality of first sampling modules, the first sampling modules being connected to an output end of the output signal line.

The first sampling module is configured to perform noise elimination processing on the output signals of the output signal line.

In this embodiment, the pixel signal processing module further includes: a plurality of first sampling modules. One end of the first sampling module is connected to the output end of the output signal line, and the other end of the first sampling module is connected to the selection module or the second processing sub-module. The first sampling module is configured to perform noise elimination processing on the output signals of the output signal line.

For example, as shown in FIG. 6, an output signal of each color pixel circuit column is Vout, an output signal of each white pixel circuit column is Vout_w, and the output signal Vout and the output signal Vout_w are each subjected to noise elimination processing by an independent correlated double sampling (CDS) circuit 910 (that is, the first sampling module). Optionally, a difference between two sampled signals, that is, VCDS signal, is obtained through sampling twice (sampled signals are stored in a capacitor C1 and a capacitor C2) and signal subtraction using an operational amplifier ACDS. The VCDS signal output from the CDS circuit 910 is input to the PGA circuit for adjustable signal amplification operation.

Figure 7:
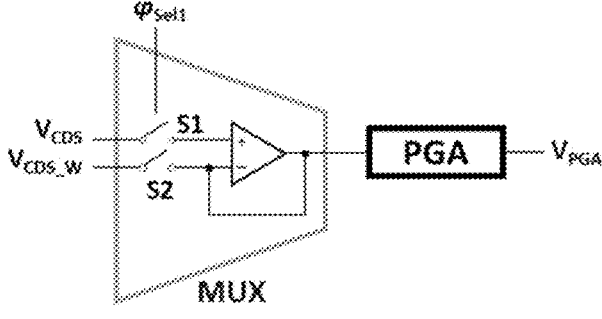
FIG. 7 is a schematic structural diagram of an analog data multiplexer according to an embodiment of this application.

As shown in FIG. 7, the MUX includes a switch S1, a switch S2, and an operational amplifier; the MUX is controlled by the φSel1 signal; and the VCDS and VCDS_W signals output from the CDS enter the MUX for signal synthesis.

In the above manner, noise elimination processing on the output signal of the color pixel circuit column and the output signal of the white pixel circuit column is implemented to improve accuracy of the signals.

It should be noted that, as shown in FIG. 6, for each sub-module on each pixel signal processing link in the pixel signal processing module 900, timing and control signals need to be provided by a signal processing & control signal module 912. After the pixel signal has traveled through all the sub-modules on the link and is buffered on the Buffer or Buffer_W, the signal enters the ISP 9084 for implementation of steps related to digital image processing. After the processing is completed, a final image signal is output by an I/O 914 to outside of the CIS chip.

Optionally, in an embodiment of this application, in a case that the white pixel circuit includes a plurality of white pixel sub-circuits and the color pixel circuit includes a plurality of color pixel sub-circuits, the pixel circuit row includes the color pixel sub-circuit, or includes the white pixel sub-circuit and the color pixel sub-circuit; and the pixel circuit column includes the color pixel sub-circuit, or includes the white pixel sub-circuit and the color pixel sub-circuit.

Figure 9:
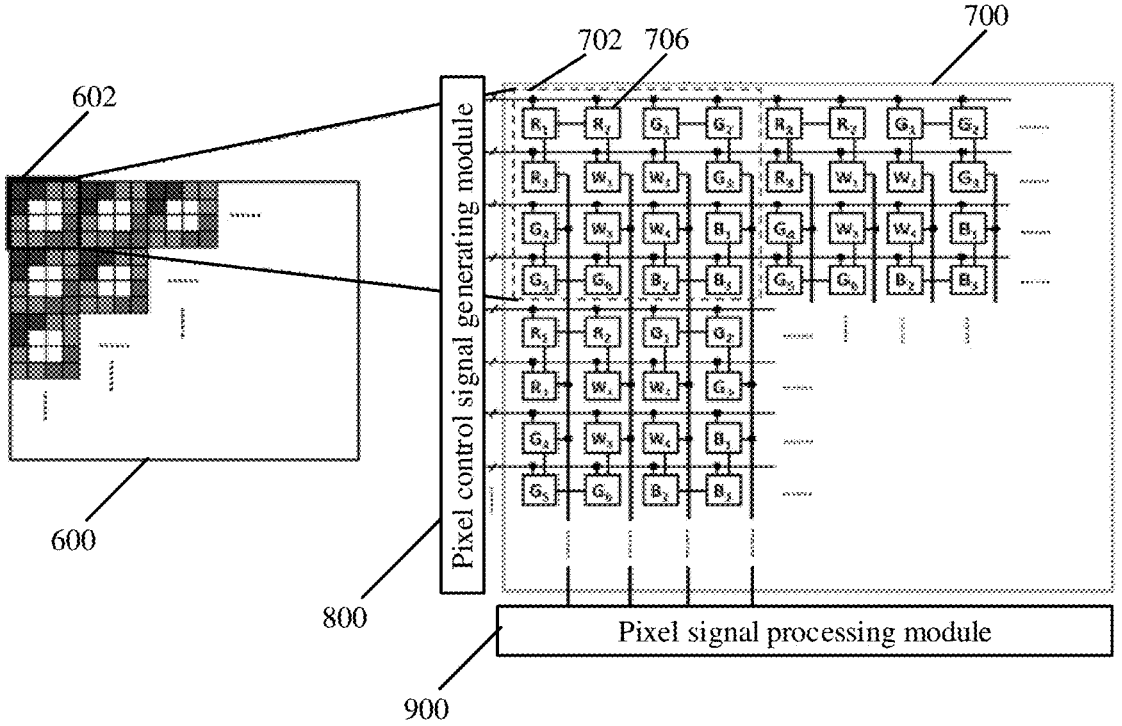
FIG. 9 is a second schematic structural diagram of a pixel circuit array according to an embodiment of this application.

In this embodiment, for the synthetic pixel scheme (shown in FIGS. 2 and 3) that splits the white pixel into a plurality of rectangular white sub-pixels and splits the color pixel into a plurality of rectangular color sub-pixels, using the structure shown in FIG. 2 as an example, each pixel cluster 602 of the pixel array 600 includes 16 sub-pixels, so that each pixel cluster circuit 702 of the pixel circuit array 700 includes 16 pixel sub-circuits 706, 4 white pixel sub-circuits and 12 color pixel sub-circuits, as shown in FIG. 9. Each row of pixel sub-circuits is controlled by the pixel control signal generation module 800, and an output signal of each column of pixel sub-circuits is transmitted to the pixel signal processing module 900, for processing by the pixel signal processing module 900.

In the pixel circuit array, the pixel sub-circuits in each row include two cases: one in which only color pixel sub-circuits are included in each row, and the other in which both white pixel sub-circuits and color pixel sub-circuits are included in each row. The pixel sub-circuits in each column include two cases, one in which only color pixel sub-circuits are included in each column, and the other in which both white pixel sub-circuits and color pixel sub-circuits are included in each column.

All pixel sub-circuits (regardless of color pixel sub-circuits or white pixel sub-circuits) in each row are controlled by the pixel control signal generation module, that is, all pixel sub-circuits in each row share one common pixel control signal (that is, control signal line). Signals output by all the pixel sub-circuits (whether color pixel sub-circuits or white pixel sub-circuits) in each column share one common signal transmission line (that is, an output signal line) to reach the pixel signal processing module.

An embodiment of this application provides an RGBW pixel circuit array architecture. On the one hand, this pixel circuit array architecture is applicable to the synthesized pixel scheme of CFA (for example, RGBW3.0 CFA), which resolves the problem that the synthesized pixel scheme of CFA cannot use conventional pixel circuit arrays, and provides a basis for wide application of the CFA in CISs; on the other hand, in the pixel circuit array, each pixel circuit is capable of signal processing and readout, effectively avoiding crosstalk of signals between pixels while adapting to adopt the pixel structure of the CFA.

Optionally, in an embodiment of this application, the pixel signal processing module includes: a plurality of second processing modules, where the second processing module is connected to the output signal line; and a second processing buffer module, where the second processing buffer module includes: a plurality of second demultiplexing modules, where the second demultiplexing module is connected to a first target processing module, the first target processing module is a second processing module connected to an output signal line that is corresponding to a first target pixel circuit column, and the first target pixel circuit column is a pixel circuit column including the white pixel sub-circuit and the color pixel sub-circuit; a plurality of third buffer modules, where the third buffer module is connected to the second demultiplexing module; a plurality of fourth buffer modules, where the fourth buffer module is connected to the second demultiplexing module or the fourth buffer module is connected to a second target processing module, the second target processing module is a second processing module connected to an output signal line that is corresponding to a second target pixel circuit column, and the second target pixel circuit column is a pixel circuit column including the color pixel sub-circuit; and a second image processing module, connected to the third buffer module and the fourth buffer module.

The second processing module is configured to perform amplification processing on an output signal of the output signal line and perform analog-to-digital conversion processing on the output signal obtained after amplification process. The third buffer module is configured to store a fourth output signal, the fourth output signal being a signal of a white pixel sub-circuit output from the output signal line corresponding to the first target pixel circuit column. The fourth buffer module is configured to store a fifth output signal in a case of being connected to the second demultiplexing module, where the fifth output signal is a signal of a color pixel sub-circuit output from an output signal line corresponding to the first target pixel circuit column; and the fourth buffer module is configured to store a sixth output signal of the second target processing module in a case of being connected to the second target processing module. The second image processing module is configured to perform image processing on the fourth output signal, the fifth output signal, and the sixth output signal to improve signal quality of the fourth output signal, the fifth output signal, and the sixth output signal. Image processing includes post-processing such as linearity correction, bad point removal, interpolation, white balance, and automatic exposure control.

In this embodiment, for the synthesized pixel scheme, the pixel signal processing module includes a plurality of second processing modules and one second processing buffer module. The second processing buffer module includes a plurality of second demultiplexing modules, a plurality of third buffer modules, a plurality of fourth buffer modules, and one second image processing module. The second processing module is configured to perform amplification processing and analog-to-digital conversion processing on output signals of the output signal line. The second demultiplexing module transmits output signals of the first target pixel circuit column that are obtained after amplification processing and analog-to-digital conversion processing to different buffer modules (that is, the third buffer module and the fourth buffer module) for storage, respectively. Optionally, the output signals of the first target pixel circuit column include a signal of the white pixel sub-circuit (that is, the fourth output signal) and a signal of the color pixel sub-circuit (that is, the fifth output signal). The fourth output signal is transmitted using the second demultiplexing module to the third buffer module for storage, and the fifth output signal is transmitted using the second demultiplexing module to the fourth buffer module for storage.

In addition, if output signals of the second target pixel circuit column include only signals of the color pixel sub-circuit (that is, the sixth output signal), the output signals of the second target pixel circuit column are directly transmitted to the fourth buffer module for storage after amplification processing and analog-to-digital conversion processing using the second target processing module.

The second image processing module then performs image processing on the signals stored in the third buffer module and the fourth buffer module.

The first target processing module and the second target processing module each include one PGA circuit and one ADC circuit. The PGA circuit is configured to perform amplification processing on a signal, and its output signal VPGA or signal VPGA/W is then input to the ADC circuit. The ADC circuit is configured to perform analog-to-digital conversion processing on the signal VPGA or signal VPGA/W.

Figure 10:
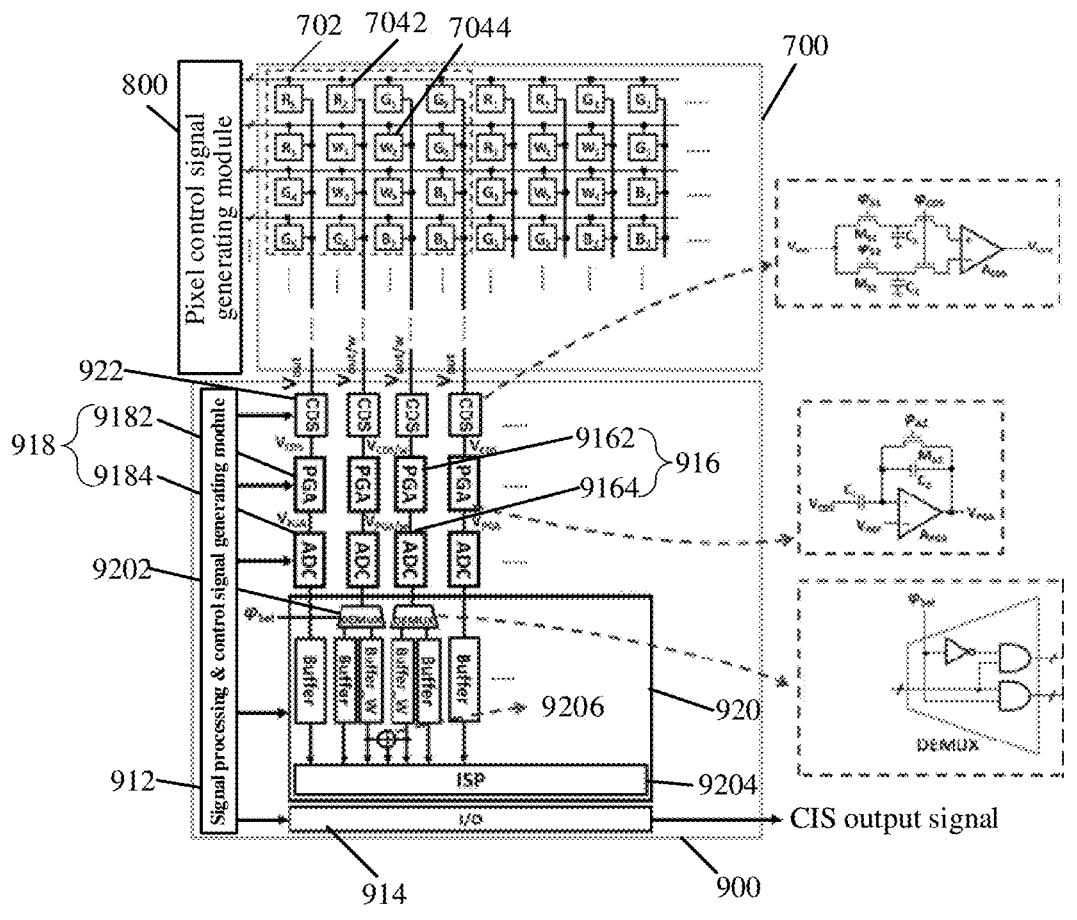
FIG. 10 is a second schematic structural diagram of a pixel signal processing module according to an embodiment of this application.

For example, as shown in FIG. 10, the pixel signal processing module 900 includes a first target processing module 916, a second target processing module 918, and a second processing buffer module 920. An output signal of each column of color pixel sub-circuits is Vout, and an output signal of each pixel circuit column including a white pixel sub-circuit and a color pixel sub-circuit is Vout/w. The output signal Vout passes through the second target processing module 918, and the output signal Vout/w passes through the first target processing module 916 and enters the ISP and the image buffer (that is, the second processing buffer module 920). The first target processing module 916 includes one PGA circuit 9162 and one ADC circuit 9164, and the second target processing module 918 includes one PGA circuit 9182 and one ADC circuit 9184.

Because white sub-pixels are located only in the middle two columns of one pixel cluster, one DEMUX 9202 is provided on a column link with white sub-pixels, and after the output signal Vout/w passes through the DEMUX 9202, color sub-pixel information (that is, the fifth output signal) and white sub-pixel information (that is, the fourth output signal) are buffered to different buffer modules (Buffer or Buffer_W). Optionally, the fifth output signal is buffered in the Buffer, and the fourth output signal is buffered in the Buffer_W. In addition, the output signal Vout (that is, the sixth output signal) of the pixel circuit column including only the color pixel sub-circuits is buffered in the Buffer.

In a case that signals of the pixel circuits are read in a row-by-row scanning manner, the first row of pixels is read first, for example, signals of color sub-pixels R1, R2, G1, and G2. After being transmitted to a corresponding PGA circuit and ADC circuit, signals of the color sub-pixels R1 and G2 are then stored into the corresponding Buffer. After being transmitted to a corresponding PGA circuit and ADC circuit, signals of the color sub-pixels R2 and G1 are allocated by the DEMUX to the corresponding Buffer for storage. Then, the second row of pixels are read, for example, signals of the color sub-pixels R3 and G3 and signals of the white sub-pixels W1 and W2 are read. The signals of the color sub-pixels R3 and G3 are transmitted to the corresponding PGA circuit and ADC circuit, and then are stored in the corresponding Buffer. After being transmitted to the corresponding PGA circuit and ADC circuit, the signals of the white sub-pixels W1 and W2 are allocated by the DEMUX to the corresponding Buffer_W for storage.

In the above manner, the pixel signal processing module is adapted to adopt the pixel array using the synthetic pixel scheme, and different buffer modules are used to buffer the signals of the color pixel sub-circuits and the signals of the white pixel sub-circuits independently, avoiding signal confusion and interference and facilitating post-processing by the ISP.

It should be noted that common buffer modules include a DRAM, an SRAM, and the like. The circuit structure of the DEMUX is shown in FIG. 8. The data demultiplexer in FIG. 10 may alternatively be placed in front of the ADC; in this case, the data demultiplexer then needs to use an analog data demultiplexer instead of a digital data demultiplexer.

Optionally, in an embodiment of this application, the second processing buffer module further includes: a plurality of signal synthesis modules, where the signal synthesis module is connected to the second image processing module, the first target buffer module, and the second target buffer module; and the first target buffer module and the second target buffer module are a third buffer module that stores signals of two white pixel sub-circuits in adjacent rows of the target pixel cluster circuit, respectively.

The signal synthesis module is configured to fuse an output signal of the first target buffer module and an output signal of the second target buffer module, that is, to enhance the output signal of the first target buffer module and the output signal of the second target buffer module.

In this embodiment, same-color pixel signal fusion may be required due to the synthesized pixel scheme, where same-color pixel synthesis for color sub-pixels generally occurs in a pixel array, and signal synthesis for white sub-pixels is more difficult to implement in a pixel array.

In this regard, the embodiments of this application provide a signal fusion scheme for white sub-pixels, where in a case of using signal fusion for color sub-pixels, the signal synthesis module is used to implement signal fusion for corresponding white sub-pixel signals. Optionally, the second processing buffer module includes a plurality of signal synthesis modules. The signal synthesis module is used for signals of two white pixel sub-circuits in adjacent rows of a target pixel cluster circuit. The signals of two white pixel sub-circuits in adjacent rows are signals separately stored in the first target buffer module and the second target buffer module, and the target pixel cluster circuit is any one pixel cluster circuit in the pixel circuit array.

For example, as shown in FIG. 10, with one adder 9206 (that is, the signal synthesis module) provided on output ends of two adjacent Buffer_Ws, signal fusion of white sub-pixels (for example, white sub-pixel W1 and white sub-pixel W2, or white sub-pixel W3 and white sub-pixel W4) can be easily implemented. It should be noted that, as shown in FIG. 10, digital signal synthesis is performed because the adder 9206 is located after the ADC.

Figure 11:
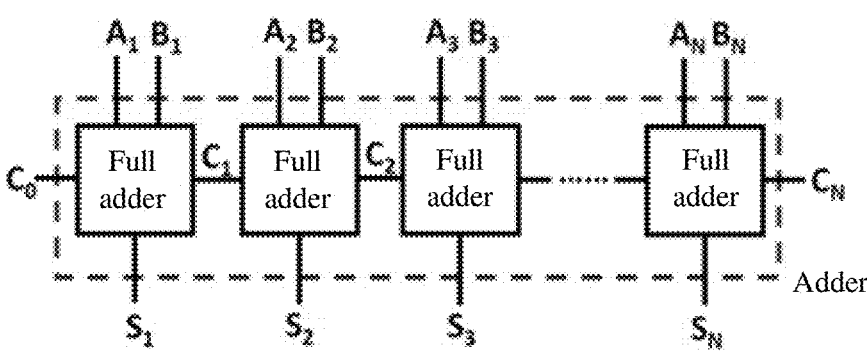
FIG. 11 is a first schematic structural diagram of an adder according to an embodiment of this application.
Figure 12:
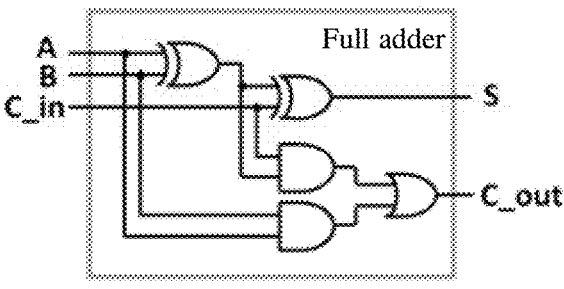
FIG. 12 is a second schematic structural diagram of an adder according to an embodiment of this application.

The circuit structure of the adder is shown in FIG. 11, and the adder has a plurality of full adders. The circuit structure of the full adder is shown in FIG. 12. The N-bit binary digital signals A1, A2, . . . , and AN and the N-bit binary digital signals B1, B2, . . . , and BN pass through the adder to generate the N-bit binary digital signals S1, S2, . . . , and SN, respectively. C1, C2, . . . , and CN are progressing bits in the addition.

In the foregoing manner, fusion of two adjacent white sub-pixel signals is implemented, which facilitates post-processing by the ISP.

Optionally, in an embodiment of this application, the pixel signal processing module further includes: a plurality of second sampling modules, the second sampling modules being connected between the second processing module and the output signal line. The second sampling module is configured to perform noise elimination processing on output signals of the output signal line.

In this embodiment, the pixel signal processing module further includes: a plurality of second sampling modules. One end of the second sampling module is connected to the output end of the output signal line, and the other end of the second sampling module is connected to the second processing module, and the second sampling module is configured to perform noise elimination processing on the output signals of the output signal line.

For example, as shown in FIG. 10, an output signal of each pixel circuit column including only color pixel sub-circuits is Vout, an output signal of each pixel circuit column including color pixel sub-circuits and white pixel sub-circuits is Vout/w, and the output signal Vout and the output signal Vout/w are each subjected to noise elimination processing by an independent CDS 922 (that is, the second sampling module).

In the above manner, noise elimination processing on output signals of the output signal line is implemented, improving accuracy of the signals.

It should be noted that, as shown in FIG. 10, for each sub-module on each pixel signal processing link in the pixel signal processing module, timing and control signals need to be provided by a signal processing & control signal module 912. After the pixel signal has traveled through all the sub-modules on the link and is buffered on the Buffer or Buffer_W, the signal enters the ISP 9204 for implementation of steps related to digital image processing. After the processing is completed, a final image signal is output by an I/O 914 to outside of the CIS chip.

An embodiment of this application provides an electronic device, where the electronic device includes an image sensor according to the foregoing embodiments.

In this embodiment, a pixel circuit array of the image sensor includes a plurality of pixel cluster circuits. That each pixel circuit row in the pixel circuit array shares one control signal line and each pixel circuit column in the pixel circuit array shares one output signal line includes: color pixel circuits in each row shares one control signal line, and white pixel circuits in each row shares one pixel control signal; and color pixel circuits in each column shares one output signal line, and white pixel circuits in each column shares one output signal line. The pixel control signal shared by the white pixel circuits in each row is independent of the pixel control signal shared by the color pixel circuits in each row, and the output signal line of the color pixel circuits is independent of the output signal line of the white pixel circuits.

The embodiments of this application provide an RGBW pixel circuit array architecture to implement a new layout of the pixel circuit array with respect to conventional pixel circuit arrays. On the one hand, this pixel circuit array architecture is applicable to CFAs (for example, RGBW3.0 CFA), which resolves the problem that the CFA cannot use conventional pixel circuit arrays, and provides a basis for wide application of the CFA in CISs; on the other hand, independent signal processing is implemented for the color pixels and the white pixels, which effectively avoids crosstalk of signals between the color pixels and the white pixels while adapting to adopt the pixel structure of the CFA, and improves sensitivity of the image sensors.

The electronic device may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The electronic device in this embodiment of this application may be an apparatus with an operating system. The operating system may be an Android operating system, an iOS operating system, or other possible operating systems, and is not specifically limited in the embodiments of this application.

Figure 13:
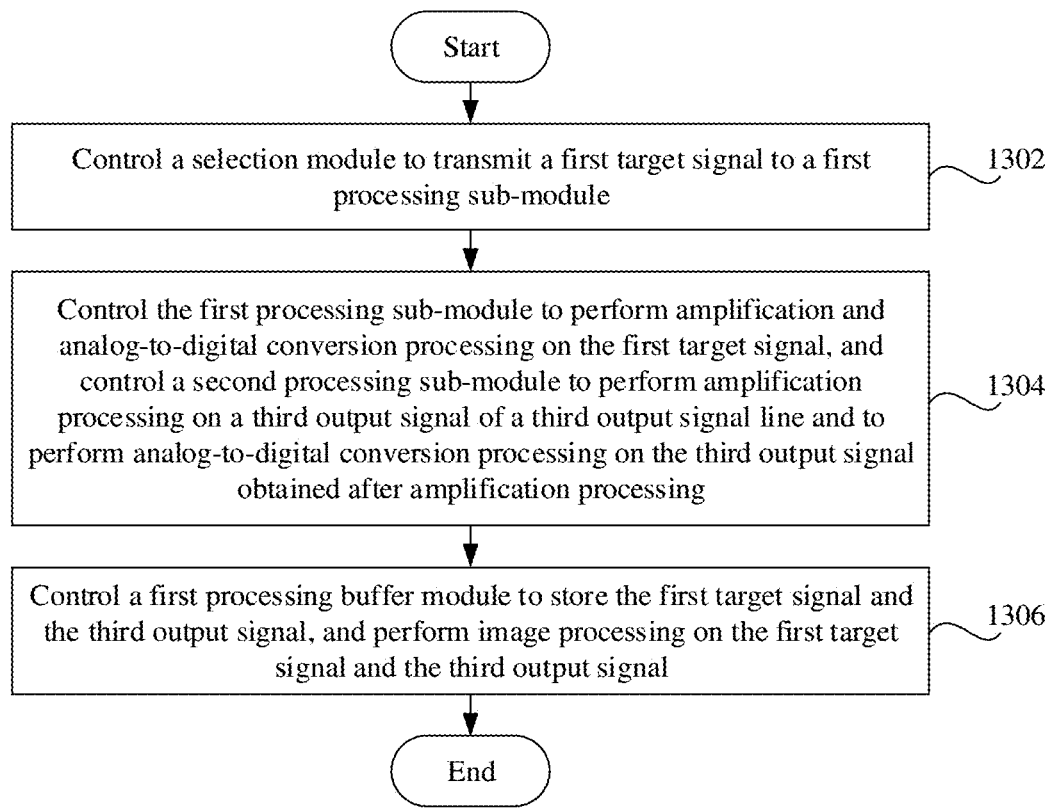
FIG. 13 is a schematic flowchart of an image sensor control method according to an embodiment of this application.

An embodiment of this application provides an image sensor control method, where the image sensor includes a pixel circuit array and a pixel signal processing module. The pixel circuit array includes a plurality of pixel cluster circuits, each of the pixel cluster circuits includes one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line. The pixel signal processing module is connected to the output signal line; in a case that the pixel circuit row includes the white pixel circuit or the color pixel circuit and that the pixel circuit column includes the white pixel circuit or the color pixel circuit, the pixel signal processing module includes a selection module, a first processing sub-module, a second processing sub-module, and a first processing buffer module. As shown in FIG. 13, the control method includes the following steps.

Step 1302: Control the selection module to transmit a first target signal to the first processing sub-module.

Step 1304: Control the first processing sub-module to perform amplification and analog-to-digital conversion processing on the first target signal, and control the second processing sub-module to perform amplification processing on a third output signal of a third output signal line and to perform analog-to-digital conversion processing on the third output signal obtained after amplification processing.

Step 1306: Control the first processing buffer module to store the first target signal and the third output signal, and to perform image processing on the first target signal and the third output signal.

The first target signal includes a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column including the white pixel circuit, and the color pixel circuit column is a pixel circuit column including the color pixel circuit.

In this embodiment, the pixel signal processing module includes a plurality of selection modules, a first processing module, and a first processing buffer module. The first processing module includes a plurality of first processing sub-modules and a plurality of second processing sub-modules. An output signal of an output signal line (that is, the first output signal line) corresponding to the white pixel circuit column and an output signal of an output signal line (that is, the second output signal line) corresponding to one color pixel circuit column adjacent to the white pixel circuit column are multiplexed into one first processing sub-module through one selection module. However, an output signal of an output signal line (that is, the third output signal line) corresponding to another color pixel circuit column adjacent to the first output signal line uses the second processing sub-module.

The first processing buffer module is connected to all of the first processing sub-modules and all of the second processing sub-modules, and is configured to sequentially store and perform image processing on the first output signal, the second output signal, and the third output signal that are obtained after amplification processing and analog-to-digital conversion processing. Image processing includes post-processing such as linearity correction, bad point removal, interpolation, white balance, and automatic exposure control.

In the embodiments of this application, because the white pixels and the color pixels are different in quantity and located in different horizontal rows, some sub-modules may be used by both the signal processing link of the white pixels and the color pixel processing link, thereby saving space and energy consumption.

Optionally, in an embodiment of this application, the first processing buffer module includes a first demultiplexing module, a first buffer module, a second buffer module, and a first image processing module. The controlling the first processing buffer module to sequentially store and perform image processing on the first target signal and the third output signal includes: controlling the first demultiplexing module to store the first output signal into the first buffer module and to store the second output signal into the second buffer module; controlling the second buffer module to store the third output signal; and controlling the first image processing module to perform image processing on the first output signal stored in the first buffer module, so as to improve signal quality of the first output signal, and to perform image processing on the second output signal and the third output signal that are stored in the second buffer module, so as to improve signal quality of the second output signal and the third output signal.

In this embodiment, the first processing buffer module includes a plurality of first demultiplexing modules, a plurality of first buffer modules, a plurality of second buffer modules, and the first image processing module. The first demultiplexing module is configured to transmit the first output signal and the second output signal output from the first processing sub-module to different buffer modules. Optionally, the first output signal is transmitted to the first buffer module, the second output signal is transmitted to the second buffer module, and the third output signal is transmitted to the second buffer module. In other words, the output signal of the white pixel circuit column is stored in the first buffer module, and the output signals of the color pixel circuit column are stored in the second buffer module.

The first image processing module then performs image processing on the signals stored in the first buffer module and the second buffer module, where image processing Optionally includes post-processing such as linearity correction, bad point removal, interpolation, white balance, and automatic exposure control.

In the above manner, the output signal of the color pixel column and the output signal of the white pixel column are buffered independently, and the first image processing module may randomly select the output signal of the color pixel column or the output signal of the white pixel column for post-processing, greatly enriching the types of image signal processing.

Optionally, in an embodiment of this application, in a case that the white pixel circuit includes a plurality of white pixel sub-circuits and the color pixel circuit includes a plurality of color pixel sub-circuits, the pixel circuit row includes the color pixel sub-circuit or includes the white pixel sub-circuit and the color pixel sub-circuit, and the pixel circuit column includes the color pixel sub-circuit or includes the white pixel sub-circuit and the color pixel sub-circuit; and the pixel signal processing module includes a second processing module and a second processing buffer module, the second processing buffer module including a second demultiplexing module, a third buffer module, a fourth buffer module, and a second image processing module. The control method further includes: controlling the second processing module to perform amplification processing on an output signal of the output signal line and to perform analog-to-digital conversion processing on an output signal of the output signal line that is obtained after amplification processing; controlling the second demultiplexing module to store a fourth output signal into the third buffer module and to store a fifth output signal into the fourth buffer module; controlling the fourth buffer module to store a sixth output signal of a second target processing module; and controlling the second image processing module to perform image processing on the fourth output signal stored in the third buffer module, so as to improve signal quality of the fourth output signal, and to perform image processing on the fifth output signal and the sixth output signal that are stored in the fourth buffer module, so as to improve signal quality of the fifth output signal and the sixth output signal. The fourth output signal is a signal of a white pixel sub-circuit output from an output signal line corresponding to a first target pixel circuit column, the first target pixel circuit column being a pixel circuit column that includes the white pixel sub-circuit and the color pixel sub-circuit; and the fifth output signal is a signal of a color pixel sub-circuit output from the output signal line corresponding to the first target pixel circuit column. The second target processing module is a second processing module connected to an output signal line corresponding to a second target pixel circuit column, the second target pixel circuit column being a pixel circuit column that includes the color pixel sub-circuit.

In this embodiment, for the synthesized pixel scheme, the pixel signal processing module includes a plurality of second processing modules and one second processing buffer module. The second processing buffer module includes a plurality of second demultiplexing modules, a plurality of third buffer modules, a plurality of fourth buffer modules, and one second image processing module. The second processing module is configured to perform amplification processing and analog-to-digital conversion processing on output signals of the output signal line. The second demultiplexing module transmits output signals of the first target pixel circuit column that are obtained after amplification processing and analog-to-digital conversion processing to different buffer modules (that is, the third buffer module and the fourth buffer module) for storage, respectively. Optionally, the output signals of the first target pixel circuit column include a signal of the white pixel sub-circuit (that is, the fourth output signal) and a signal of the color pixel sub-circuit (that is, the fifth output signal). The fourth output signal is transmitted using the second demultiplexing module to the third buffer module for storage, and the fifth output signal is transmitted using the second demultiplexing module to the fourth buffer module for storage.

In addition, if output signals of the second target pixel circuit column include only signals of the color pixel sub-circuit (that is, the sixth output signal), the output signals of the second target pixel circuit column are directly transmitted to the fourth buffer module for storage after amplification processing and analog-to-digital conversion processing using the second target processing module.

The second image processing module then performs image processing on the signals stored in the third buffer module and the fourth buffer module, where image processing includes post-processing such as linearity correction, bad point removal, interpolation, white balance, and automatic exposure control.

In the above manner, the pixel signal processing module is adapted to adopt the pixel array using the synthetic pixel scheme, and different buffer modules are used to buffer the signals of the color pixel sub-circuits and the signals of the white pixel sub-circuits independently, avoiding signal confusion and interference and facilitating post-processing by the ISP.

Optionally, in an embodiment of this application, the second processing buffer module further includes a signal synthesis module. The control method further includes: controlling the signal synthesis module to fuse an output signal of a first target buffer module with an output signal of a second target buffer module, the first target buffer module and the second target buffer module being third buffer modules storing signals of two white pixel sub-circuits in adjacent rows of a target pixel cluster circuit, respectively.

In this embodiment, same-color pixel signal fusion may be required due to the synthesized pixel scheme, where same-color pixel synthesis for color sub-pixels generally occurs in a pixel array, and signal synthesis for white sub-pixels is more difficult to implement in a pixel array.

In this regard, the embodiments of this application provide a signal fusion scheme for white sub-pixels, where in a case of using signal fusion for color sub-pixels, the signal synthesis module is used to implement signal fusion for corresponding white sub-pixel signals. Optionally, the second processing buffer module includes a plurality of signal synthesis modules. The signal synthesis module is used for signals of two white pixel sub-circuits in adjacent rows of a target pixel cluster circuit. The signals of two white pixel sub-circuits in adjacent rows are signals separately stored in the first target buffer module and the second target buffer module, and the target pixel cluster circuit is any one pixel cluster circuit in the pixel circuit array.

In the foregoing manner, fusion of two adjacent white sub-pixel signals is implemented, which facilitates post-processing by the ISP.

Optionally, in an embodiment of this application, the control method further includes: controlling the second image processing module to fuse an output signal of the signal synthesis module with a second target signal, so as to enhance the second target signal, the second target signal being a signal of a color pixel sub-circuit of the target pixel cluster circuit.

In this embodiment, in a case that signal fusion is performed on the color sub-pixel signals and signal fusion is performed on the white sub-pixel signals, the fused white sub-pixel signals are paired with the fused color sub-pixel signals in the same pixel cluster. In other words, signal fusion between the white sub-pixel signals and the color sub-pixel signals in the same pixel cluster is implemented by using the second image processing module to enhance the degree of light sensitivity of the color sub-pixels.

In the above manner, this facilitates post-processing by the ISP, and greatly enriches the types of image signal processing.

It should be noted that, for the image sensor control method provided in the embodiments of this application, the execution body may be an image sensor control apparatus, or a control module for executing the image sensor control method in the image sensor control apparatus. In the embodiments of this application, the image sensor control apparatus provided in the embodiments of this application is described by using the image sensor control method being executed by the image sensor control apparatus as an example.

Figure 14:
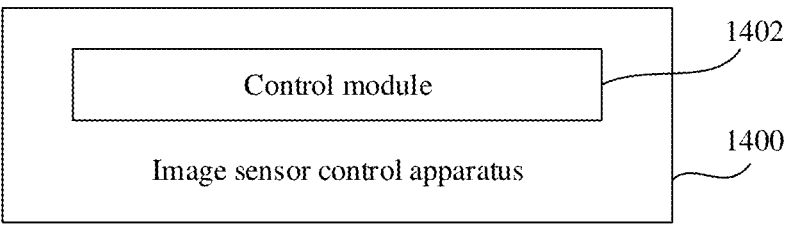
FIG. 14 is a schematic block diagram of an image sensor control apparatus according to an embodiment of this application.

An embodiment of this application provides an image sensor control apparatus, where an image sensor includes a pixel circuit array and a pixel signal processing module. The pixel circuit array includes a plurality of pixel cluster circuits, each of the pixel cluster circuits includes one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line. The pixel signal processing module is connected to the output signal line; in a case that the pixel circuit row includes the white pixel circuit or the color pixel circuit and that the pixel circuit column includes the white pixel circuit or the color pixel circuit, the pixel signal processing module includes a selection module, a first processing sub-module, a second processing sub-module, and a first processing buffer module. As shown in FIG. 14, the control apparatus includes a control module 1402. The control module 1402 is configured to:

control the selection module to transmit a first target signal to the first processing sub-module;

control the first processing sub-module to perform amplification and analog-to-digital conversion processing on the first target signal, and control the second processing sub-module to perform amplification processing on a third output signal of a third output signal line and to perform analog-to-digital conversion processing on the third output signal obtained after amplification processing; and control the first processing buffer module to store the first target signal and the third output signal, and to perform image processing on the first target signal and the third output signal.

The first target signal includes a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column including the white pixel circuit, and the color pixel circuit column is a pixel circuit column including the color pixel circuit.

In this embodiment, the pixel signal processing module includes a plurality of selection modules, a first processing module, and a first processing buffer module. The first processing module includes a plurality of first processing sub-modules and a plurality of second processing sub-modules. An output signal of an output signal line (that is, the first output signal line) corresponding to the white pixel circuit column and an output signal of an output signal line (that is, the second output signal line) corresponding to one color pixel circuit column adjacent to the white pixel circuit are multiplexed into one first processing sub-module through one selection module. However, an output signal of an output signal line (that is, the third output signal line) corresponding to another color pixel circuit column adjacent to the first output signal line uses the second processing sub-module.

The first processing buffer module is connected to all of the first processing sub-modules and all of the second processing sub-modules, and is configured to sequentially store and perform image processing on the first output signal, the second output signal, and the third output signal that are obtained after amplification processing and analog-to-digital conversion processing. Image processing includes post-processing such as linearity correction, bad point removal, interpolation, white balance, and automatic exposure control.

In the embodiments of this application, because the white pixels and the color pixels are different in quantity and located in different horizontal rows, some sub-modules may be used by both the signal processing link of the white pixels and the color pixel processing link, thereby saving space and energy consumption.

Optionally, in an embodiment of this application, the first processing buffer module includes a first demultiplexing module, a first buffer module, a second buffer module, and a first image processing module. The control module 1402 is further configured to: control the first demultiplexing module to store the first output signal into the first buffer module and to store the second output signal into the second buffer module; control the second buffer module to store the third output signal; and control the first image processing module to perform image processing on the first output signal stored in the first buffer module, so as to improve signal quality of the first output signal, and to perform image processing on the second output signal and the third output signal that are stored in the second buffer module, so as to improve signal quality of the second output signal and the third output signal.

Optionally, in an embodiment of this application, in a case that the white pixel circuit includes a plurality of white pixel sub-circuits and the color pixel circuit includes a plurality of color pixel sub-circuits, the pixel circuit row includes the color pixel sub-circuit or includes the white pixel sub-circuit and the color pixel sub-circuit, and the pixel circuit column includes the color pixel sub-circuit or includes the white pixel sub-circuit and the color pixel sub-circuit; and the pixel signal processing module includes a second processing module and a second processing buffer module, the second processing buffer module including a second demultiplexing module, a third buffer module, a fourth buffer module, and a second image processing module. The control module 1402 is further configured to: control the second processing module to perform amplification processing on an output signal of the output signal line and to perform analog-to-digital conversion processing on an output signal of the output signal line that is obtained after amplification processing; control the second demultiplexing module to store a fourth output signal into the third buffer module and to store a fifth output signal into the fourth buffer module; control the fourth buffer module to store a sixth output signal of a second target processing module; and control the second image processing module to perform image processing on the fourth output signal stored in the third buffer module, so as to improve signal quality of the fourth output signal, and to perform image processing on the fifth output signal and the sixth output signal that are stored in the fourth buffer module, so as to improve signal quality of the fifth output signal and the sixth output signal. The fourth output signal is a signal of a white pixel sub-circuit output from an output signal line corresponding to a first target pixel circuit column, the first target pixel circuit column being a pixel circuit column that includes the white pixel sub-circuit and the color pixel sub-circuit; the fifth output signal is a signal of a color pixel sub-circuit output from the output signal line corresponding to the first target pixel circuit column; and the second target processing module is a second processing module connected to an output signal line corresponding to a second target pixel circuit column, the second target pixel circuit column being a pixel circuit column that includes the color pixel sub-circuit.

Optionally, in an embodiment of this application, the second processing buffer module further includes a signal synthesis module. The control module 1402 is further configured to: control the signal synthesis module to fuse an output signal of a first target buffer module with an output signal of a second target buffer module, the first target buffer module and the second target buffer module being third buffer modules storing signals of two white pixel sub-circuits in adjacent rows of a target pixel cluster circuit, respectively.

Optionally, in an embodiment of this application, the control module 1402 is further configured to: control the second image processing module to fuse an output signal of the signal synthesis module with a second target signal, so as to enhance the second target signal, the second target signal being a signal of a color pixel sub-circuit of the target pixel cluster circuit.

The image sensor control apparatus 1400 in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The image sensor control apparatus 1400 in this embodiment of this application may be an apparatus with an operating system. The operating system may be an Android operating system, an iOS operating system, or other possible operating systems, and is not specifically limited in the embodiments of this application.

The image sensor control apparatus 1400 provided in this embodiment of this application is capable of implementing the processes that are implemented by the method embodiments in FIG. 13. To avoid repetition, details are not described herein again.

Figure 15:
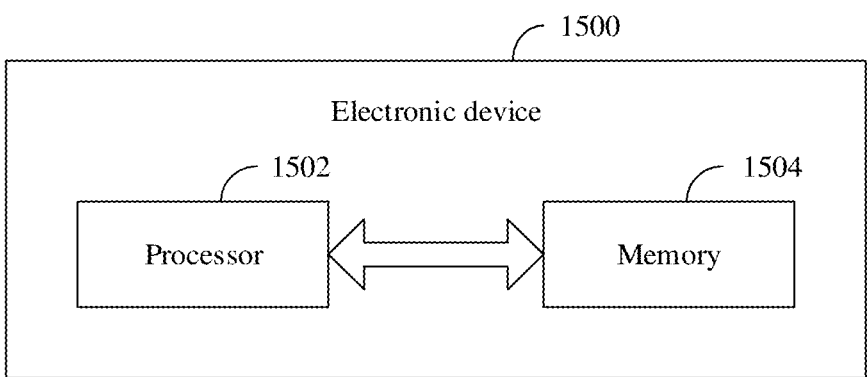
FIG. 15 is a first schematic block diagram of an electronic device according to an embodiment of this application.

Optionally, as shown in FIG. 15, an embodiment of this application further provides an electronic device 1500, including a processor 1502, a memory 1504, and a program or instructions stored in the memory 1504 and capable of running on the processor 1502. When the program or the instructions are executed by the processor 1502, the processes of the foregoing embodiments of the pixel array control method are implemented, with the same technical effects achieved. To avoid repetition, details are not described herein again.

It should be noted that the electronic device in this embodiment of this application includes the aforementioned mobile electronic device and non-mobile electronic device.

Figure 16:
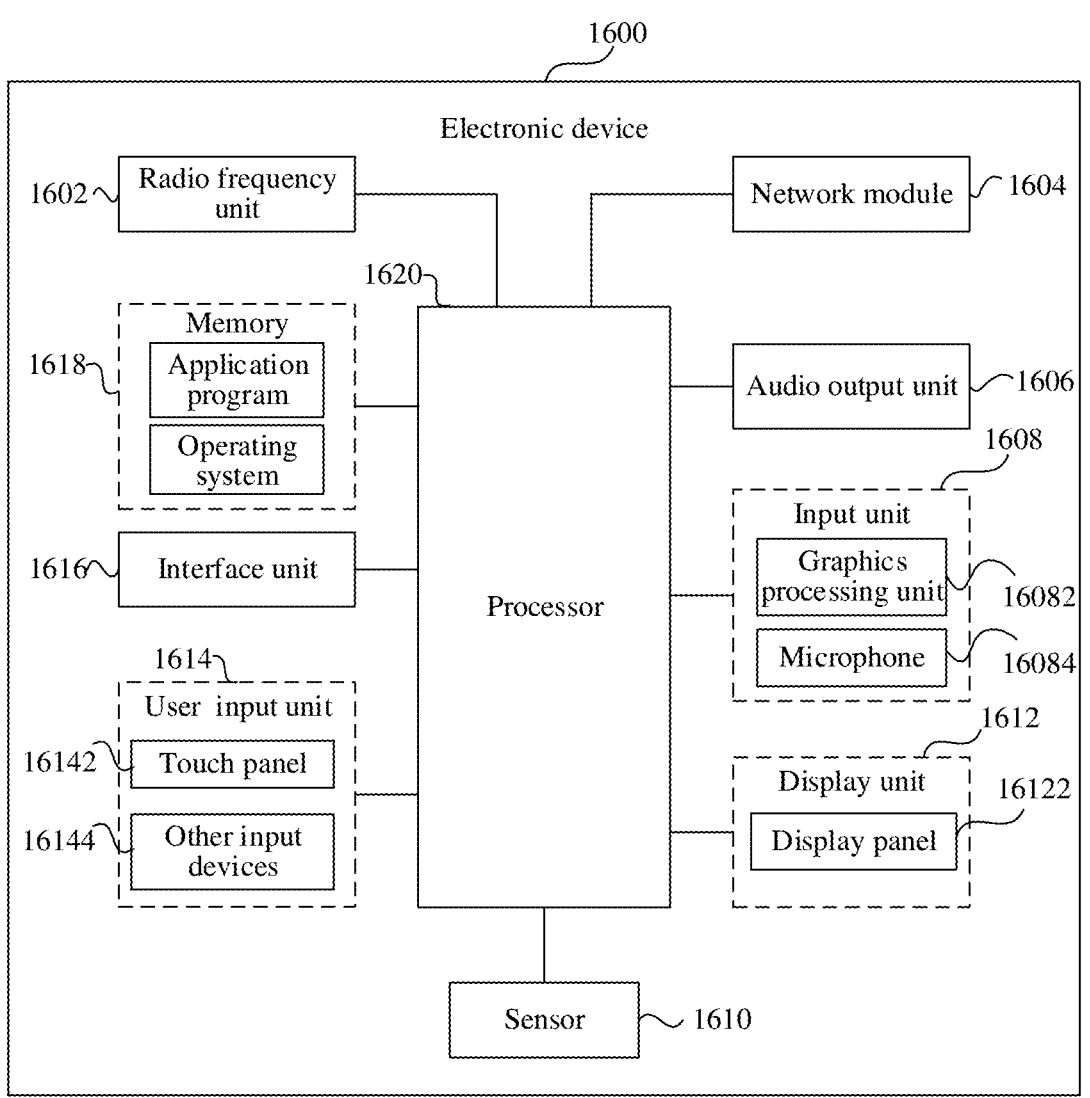
FIG. 16 is a second schematic block diagram of an electronic device according to an embodiment of this application.

FIG. 16 is a schematic diagram of a hardware structure of an electronic device according to an embodiment of this application.

The electronic device 1600 includes but is not limited to components such as a radio frequency unit 1602, a network module 1604, an audio output unit 1606, an input unit 1608, a sensor 1610, a display unit 1612, a user input unit 1614, an interface unit 1616, a memory 1618, and a processor 1620.

A person skilled in the art can understand that the electronic device 1600 may further include a power supply (for example, a battery) supplying power to all components, and the power supply may be logically connected to the processor 1620 through a power management system. In this way, functions such as charge management, discharge management, and power consumption management are implemented by using the power management system. The structure of the electronic device shown in FIG. 16 does not constitute any limitation on the electronic device. The electronic device may include more or fewer components than shown in the figure, or a combination of some components, or the components disposed differently. Details are not repeated herein.

The sensor 1610 of the electronic device 1600 includes an image sensor. The image sensor includes a pixel circuit array and a pixel signal processing module. The pixel circuit array includes a plurality of pixel cluster circuits, each of the pixel cluster circuits includes one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line. The pixel signal processing module is connected to the output signal line; in a case that the pixel circuit row includes the white pixel circuit or the color pixel circuit and that the pixel circuit column includes the white pixel circuit or the color pixel circuit, the pixel signal processing module includes a selection module, a first processing sub-module, a second processing sub-module, and a first processing buffer module. The processor 1620 is configured to:

control the selection module to transmit a first target signal to the first processing sub-module;

control the first processing sub-module to perform amplification and analog-to-digital conversion processing on the first target signal, and control the second processing sub-module to perform amplification processing on a third output signal of a third output signal line and to perform analog-to-digital conversion processing on the third output signal obtained after amplification processing; and control the first processing buffer module to store the first target signal and the third output signal, and to perform image processing on the first target signal and the third output signal.

The first target signal includes a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column including the white pixel circuit, and the color pixel circuit column is a pixel circuit column including the color pixel circuit.

In this embodiment, the pixel signal processing module includes a plurality of selection modules, a first processing module, and a first processing buffer module. The first processing module includes a plurality of first processing sub-modules and a plurality of second processing sub-modules. An output signal of an output signal line (that is, the first output signal line) corresponding to the white pixel circuit column and an output signal of an output signal line (that is, the second output signal line) corresponding to one color pixel circuit column adjacent to the white pixel circuit column are multiplexed into one first processing sub-module through one selection module. However, an output signal of an output signal line (that is, the third output signal line) corresponding to another color pixel circuit column adjacent to the first output signal line uses the second processing sub-module.

The first processing buffer module is connected to all of the first processing sub-modules and all of the second processing sub-modules, and is configured to sequentially store and perform image processing on the first output signal, the second output signal, and the third output signal that are obtained after amplification processing and analog-to-digital conversion processing. Image processing includes post-processing such as linearity correction, bad point removal, interpolation, white balance, and automatic exposure control.

In the embodiments of this application, because the white pixels and the color pixels are different in quantity and located in different horizontal rows, some sub-modules may be used by both the signal processing link of the white pixels and the color pixel processing link, thereby saving space and energy consumption.

Optionally, in an embodiment of this application, the first processing buffer module includes a first demultiplexing module, a first buffer module, a second buffer module, and a first image processing module. The processor 1620 is further configured to: control the first demultiplexing module to store the first output signal into the first buffer module and to store the second output signal into the second buffer module; control the second buffer module to store the third output signal; and control the first image processing module to perform image processing on the first output signal stored in the first buffer module, so as to improve signal quality of the first output signal, and to perform image processing on the second output signal and the third output signal that are stored in the second buffer module, so as to improve signal quality of the second output signal and the third output signal.

Optionally, in an embodiment of this application, in a case that the white pixel circuit includes a plurality of white pixel sub-circuits and the color pixel circuit includes a plurality of color pixel sub-circuits, the pixel circuit row includes the color pixel sub-circuit or includes the white pixel sub-circuit and the color pixel sub-circuit, and the pixel circuit column includes the color pixel sub-circuit or includes the white pixel sub-circuit and the color pixel sub-circuit; and the pixel signal processing module includes a second processing module and a second processing buffer module, the second processing buffer module including a second demultiplexing module, a third buffer module, a fourth buffer module, and a second image processing module. The processor 1620 is further configured to: control the second processing module to perform amplification processing on an output signal of the output signal line and to perform analog-to-digital conversion processing on an output signal of the output signal line that is obtained after amplification processing; control the second demultiplexing module to store a fourth output signal into the third buffer module and to store a fifth output signal into the fourth buffer module; control the fourth buffer module to store a sixth output signal of a second target processing module; and control the second image processing module to perform image processing on the fourth output signal stored in the third buffer module, so as to improve signal quality of the fourth output signal, and to perform image processing on the fifth output signal and the sixth output signal that are stored in the fourth buffer module, so as to improve signal quality of the fifth output signal and the sixth output signal. The fourth output signal is a signal of a white pixel sub-circuit output from an output signal line corresponding to a first target pixel circuit column, the first target pixel circuit column being a pixel circuit column that includes the white pixel sub-circuit and the color pixel sub-circuit; the fifth output signal is a signal of a color pixel sub-circuit output from the output signal line corresponding to the first target pixel circuit column; and the second target processing module is a second processing module connected to an output signal line corresponding to a second target pixel circuit column, the second target pixel circuit column being a pixel circuit column that includes the color pixel sub-circuit.

Optionally, in an embodiment of this application, the second processing buffer module further includes a signal synthesis module. The processor 1620 is further configured to: control the signal synthesis module to fuse an output signal of a first target buffer module with an output signal of a second target buffer module, the first target buffer module and the second target buffer module being third buffer modules storing signals of two white pixel sub-circuits in adjacent rows of a target pixel cluster circuit, respectively.

Optionally, in an embodiment of this application, the processor 1620 is further configured to: control the second image processing module to fuse an output signal of the signal synthesis module with a second target signal, so as to enhance the second target signal, the second target signal being a signal of a color pixel sub-circuit of the target pixel cluster circuit.

It should be understood that in this embodiment of this application, the radio frequency unit 1602 may be configured to receive and send information, or to receive and send a signal in a call process, and Optionally, receive downlink data from a base station or send uplink data to the base station. The radio frequency unit 1602 includes but is not limited to an antenna, at least one amplifier, a transceiver, a coupler, a low noise amplifier, a duplexer, and the like.

The network module 1604 provides the user with wireless broadband Internet access through the network module 1604, for example, helping the user to send and receive e-mails, browse web pages, and access streaming media.

The audio output unit 1606 may convert audio data received by the radio frequency unit 1602 or the network module 1604 or stored in the memory 1618 into an audio signal and output the audio signal as a sound. Furthermore, the audio output unit 1606 may also provide audio output (for example, a call signal received sound or a message received sound) related to a specific function performed by the electronic device 1600. The audio output unit 1606 includes a speaker, a buzzer, a receiver, and the like.

The input unit 1608 is configured to receive an audio or video signal. The input unit 1608 may include a graphics processing unit (GPU) 16082 and a microphone 16084. The graphics processing unit 16082 processes image data of a still picture or video obtained by an image capture apparatus (such as a camera) in a video capture mode or an image capture mode. The image frame processed may be displayed on the display unit 1612, or stored in the memory 1618 (or another storage medium), or be transmitted via the radio frequency unit 1602 or the network module 1604. The microphone 16084 is capable of receiving sounds and processing such sounds into audio data. The processed audio data may be converted in a telephone call mode into a format that can be transmitted by the radio frequency unit 1602 to a mobile communications base station, for outputting.

The electronic device 1600 may further include at least one sensor 1610, for example, a fingerprint sensor, a pressure sensor, an iris sensor, a molecular sensor, a gyroscope, a barometer, a hygrometer, a thermometer, an infrared sensor, an optical sensor, a motion sensor, and other sensors.

The display unit 1612 is configured to display information input by the user or information provided to the user. The display unit 1612 may include a display panel 16122, and the display panel 16122 may be configured in a form of a liquid crystal display, an organic light-emitting diode, and the like.

The user input unit 1614 may be configured to receive input digit or character information and generate key signal input related to user setting and function control of the electronic device. Optionally, the user input unit 1614 may include a touch panel 16142 and other input devices 16144. The touch panel 16142 is also referred to as a touchscreen and can collect a touch operation of the user on or near the touch panel. The touch panel 16142 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 1620, and can receive a command sent by the processor 1620 and execute the command. The other input devices 16144 may include but are not limited to a physical keyboard, a function key (such as a volume control key or a power on/off key), a trackball, a mouse, a joystick, and the like. Details are not described herein.

Optionally, the touch panel 16142 may cover the display panel 16122. When detecting a touch operation on or near the touch panel 16142, the touch panel 16142 transmits the touch operation to the processor 1620 to determine a type of a touch event. Then, the processor 1620 provides a corresponding visual output on the display panel 16122 based on the type of the touch event. The touch panel 16142 and the display panel 16122 may act as two independent parts or may be integrated in one component.

The interface unit 1616 is an interface between an external apparatus and the electronic device 1600. For example, an external apparatus may include a wired or wireless headset port, an external power supply (or a battery charger) port, a wired or wireless data port, a memory card port, a port for connecting an apparatus with an identification module, an audio input/output (I/O) port, a video I/O port, an earphone port, and the like. The interface unit 1616 may be configured to: receive input (for example, data information and power) from the external apparatus, and transmit the received input to one or more elements in the electronic device 1600, or may be configured to transmit data between the electronic device 1600 and the external apparatus.

The memory 1618 may be configured to store software programs and various data. The memory 1618 may mainly include a program storage area and a data storage area. The program storage area may store an operating system, and an application program required by at least one function (for example, a sound playback function or an image playback function). The data storage area may store data (for example, audio data or a phone book) created according to use of the mobile terminal. In addition, the memory 1618 may include a high-speed random access memory, and may further include a non-volatile memory such as a disk storage device, a flash memory device, or another volatile solid-state storage device.

The processor 1620 executes various functions and processing data of the electronic device 1618 by running or executing software programs and/or modules stored in the memory 1618 and invoking data stored in the memory 1600, so as to perform overall monitoring on the electronic device 1600. The processor 1620 may include one or more processing units. Optionally, an application processor and a modem processor may be integrated in the processor 1620. The application processor primarily processes an operating system, user interfaces, application programs, and the like. The modem processor primarily processes radio communication.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing implementations. These implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An image sensor, comprising:

a pixel circuit array, wherein the pixel circuit array comprises a plurality of pixel cluster circuits, each of the pixel cluster circuits comprises one white pixel circuit and at least two color pixel circuits, and the at least two color pixel circuits are disposed around the white pixel circuit; and the pixel circuit array comprises at least two pixel circuit rows and at least two pixel circuit columns, the at least two pixel circuit rows share one control signal line, and the at least two pixel circuit columns share one output signal line, wherein the pixel circuit row comprises the white pixel circuit or the color pixel circuit, and the pixel circuit column comprises the white pixel circuit or the color pixel circuit; and a pixel signal processing module, wherein the pixel signal processing module is connected to the output signal line; wherein the pixel signal processing module comprises:

a plurality of selection modules, wherein the selection module is connected to a first output signal line and a second output signal line, wherein the first output signal line is an output signal line corresponding to a white pixel circuit column, the second output signal line is an output signal line corresponding to one color pixel circuit column adjacent to the white pixel circuit column, the white pixel circuit column is a pixel circuit column comprising the white pixel circuit, and the color pixel circuit column is a pixel circuit column comprising the color pixel circuit;

a first processing module, wherein the first processing module comprises:

a plurality of first processing sub-modules, wherein the first processing sub-module is connected to the selection module; and a plurality of second processing sub-modules, wherein the second processing sub-module is connected to a third output signal line, and the third output signal line is an output signal line corresponding to another color pixel circuit column adjacent to the white pixel circuit column; and a first processing buffer module, connected to the first processing module.

2. The image sensor according to claim 1, wherein the first processing buffer module comprises:

a plurality of first demultiplexing modules, wherein the first demultiplexing module is connected to the first processing sub-module;

a plurality of first buffer modules, wherein the first buffer module is connected to the first demultiplexing module;

a plurality of second buffer modules, wherein the second buffer module is connected to the first demultiplexing module or the second buffer module is connected to the second processing sub-module; and a first image processing module, connected to the first buffer module and the second buffer module.

3. The image sensor according to claim 1, wherein the pixel signal processing module further comprises:

a plurality of first sampling modules, wherein the first sampling module is connected to an output end of the output signal line.

4. The image sensor according to claim 1, wherein in a case that the white pixel circuit comprises a plurality of white pixel sub-circuits and the color pixel circuit comprises a plurality of color pixel sub-circuits, the pixel circuit row comprises the color pixel sub-circuit, or comprises the white pixel sub-circuit and the color pixel sub-circuit; and the pixel circuit column comprises the color pixel sub-circuit, or comprises the white pixel sub-circuit and the color pixel sub-circuit.

5. The image sensor according to claim 4, wherein the pixel signal processing module comprises:

a plurality of second processing modules, wherein the second processing module is connected to the output signal line; and a second processing buffer module, wherein the second processing buffer module comprises:

a plurality of second demultiplexing modules, wherein the second demultiplexing module is connected to a first target processing module, the first target processing module is a second processing module connected to an output signal line that is corresponding to a first target pixel circuit column, and the first target pixel circuit column is a pixel circuit column comprising the white pixel sub-circuit and the color pixel sub-circuit;

a plurality of third buffer modules, wherein the third buffer module is connected to the second demultiplexing module;

a plurality of fourth buffer modules, wherein the fourth buffer module is connected to the second demultiplexing module or the fourth buffer module is connected to a second target processing module, the second target processing module is a second processing module connected to an output signal line that is corresponding to a second target pixel circuit column, and the second target pixel circuit column is a pixel circuit column comprising the color pixel sub-circuit; and a second image processing module, connected to the third buffer module and the fourth buffer module.

6. The image sensor according to claim 5, wherein the second processing buffer module further comprises:

a plurality of signal synthesis modules, wherein the signal synthesis module is connected to the second image processing module, the first target buffer module, and the second target buffer module; and the first target buffer module and the second target buffer module are a third buffer module that stores signals of two white pixel sub-circuits in adjacent rows of a target pixel cluster circuit, respectively.

7. The image sensor according to claim 5, wherein the pixel signal processing module further comprises:

a plurality of second sampling modules, wherein the second sampling module is connected between the second processing module and the output signal line.

8. An electronic device, comprising: an image sensor, wherein the image sensor comprises:

a pixel circuit array, wherein the pixel circuit array comprises a plurality of pixel cluster circuits, each of the pixel cluster circuits comprises one white pixel circuit and at least two color pixel circuits, and the at least two color pixel circuits are disposed around the white pixel circuit; and the pixel circuit array comprises at least two pixel circuit rows and at least two pixel circuit columns, the at least two pixel circuit rows share one control signal line, and the at least two pixel circuit columns share one output signal line, wherein the pixel circuit row comprises the white pixel circuit or the color pixel circuit, and the pixel circuit column comprises the white pixel circuit or the color pixel circuit; and a pixel signal processing module, wherein the pixel signal processing module is connected to the output signal line; wherein the pixel signal processing module comprises:

a plurality of selection modules, wherein the selection module is connected to a first output signal line and a second output signal line, wherein the first output signal line is an output signal line corresponding to a white pixel circuit column, the second output signal line is an output signal line corresponding to one color pixel circuit column adjacent to the white pixel circuit column, the white pixel circuit column is a pixel circuit column comprising the white pixel circuit, and the color pixel circuit column is a pixel circuit column comprising the color pixel circuit;

a first processing module, wherein the first processing module comprises:

a plurality of first processing sub-modules, wherein the first processing sub-module is connected to the selection module; and a plurality of second processing sub-modules, wherein the second processing sub-module is connected to a third output signal line, and the third output signal line is an output signal line corresponding to another color pixel circuit column adjacent to the white pixel circuit column; and a first processing buffer module, connected to the first processing module.

9. The electronic device according to claim 8, wherein the first processing buffer module comprises:

a plurality of first demultiplexing modules, wherein the first demultiplexing module is connected to the first processing sub-module;

a plurality of first buffer modules, wherein the first buffer module is connected to the first demultiplexing module;

a plurality of second buffer modules, wherein the second buffer module is connected to the first demultiplexing module or the second buffer module is connected to the second processing sub-module; and a first image processing module, connected to the first buffer module and the second buffer module.

10. The electronic device according to claim 8, wherein the pixel signal processing module further comprises:

a plurality of first sampling modules, wherein the first sampling module is connected to an output end of the output signal line.

11. The electronic device according to claim 8, wherein in a case that the white pixel circuit comprises a plurality of white pixel sub-circuits and the color pixel circuit comprises a plurality of color pixel sub-circuits, the pixel circuit row comprises the color pixel sub-circuit, or comprises the white pixel sub-circuit and the color pixel sub-circuit; and the pixel circuit column comprises the color pixel sub-circuit, or comprises the white pixel sub-circuit and the color pixel sub-circuit.

12. The electronic device according to claim 11, wherein the pixel signal processing module comprises:

a plurality of second processing modules, wherein the second processing module is connected to the output signal line; and a second processing buffer module, wherein the second processing buffer module comprises:

a plurality of second demultiplexing modules, wherein the second demultiplexing module is connected to a first target processing module, the first target processing module is a second processing module connected to an output signal line that is corresponding to a first target pixel circuit column, and the first target pixel circuit column is a pixel circuit column comprising the white pixel sub-circuit and the color pixel sub-circuit;

a plurality of third buffer modules, wherein the third buffer module is connected to the second demultiplexing module;

a plurality of fourth buffer modules, wherein the fourth buffer module is connected to the second demultiplexing module or the fourth buffer module is connected to a second target processing module, the second target processing module is a second processing module connected to an output signal line that is corresponding to a second target pixel circuit column, and the second target pixel circuit column is a pixel circuit column comprising the color pixel sub-circuit; and a second image processing module, connected to the third buffer module and the fourth buffer module.

13. The electronic device according to claim 12, wherein the second processing buffer module further comprises:

a plurality of signal synthesis modules, wherein the signal synthesis module is connected to the second image processing module, the first target buffer module, and the second target buffer module; and the first target buffer module and the second target buffer module are a third buffer module that stores signals of two white pixel sub-circuits in adjacent rows of a target pixel cluster circuit, respectively.

14. The electronic device according to claim 12, wherein the pixel signal processing module further comprises:

a plurality of second sampling modules, wherein the second sampling module is connected between the second processing module and the output signal line.

15. An image sensor control method, wherein an image sensor comprises a pixel circuit array and a pixel signal processing module; the pixel circuit array comprises a plurality of pixel cluster circuits, each of the pixel cluster circuits comprises one white pixel circuit and a plurality of color pixel circuits, and the plurality of color pixel circuits are disposed around the white pixel circuit; each pixel circuit row in the pixel circuit array shares one control signal line, and each pixel circuit column in the pixel circuit array shares one output signal line; and the pixel signal processing module is connected to the output signal line;

in a case that the pixel circuit row comprises the white pixel circuit or the color pixel circuit and that the pixel circuit column comprises the white pixel circuit or the color pixel circuit, the pixel signal processing module comprises a selection module, a first processing sub-module, a second processing sub-module, and a first processing buffer module; and the control method comprises:

controlling the selection module to transmit a first target signal to the first processing sub-module;

controlling the first processing sub-module to perform amplification and analog-to-digital conversion processing on the first target signal, and controlling the second processing sub-module to perform amplification processing on a third output signal of a third output signal line and to perform analog-to-digital conversion processing on the third output signal obtained after amplification processing; and controlling the first processing buffer module to store the first target signal and the third output signal, and to perform image processing on the first target signal and the third output signal; wherein the first target signal comprises a first output signal of a first output signal line or a second output signal of a second output signal line, the first output signal line being an output signal line corresponding to a white pixel circuit column, the second output signal line being an output signal line corresponding to one color pixel circuit column adjacent to the white pixel circuit column, and the third output signal line being an output signal line corresponding to another color pixel circuit column adjacent to the white pixel circuit column; and the white pixel circuit column is a pixel circuit column comprising the white pixel circuit, and the color pixel circuit column is a pixel circuit column comprising the color pixel circuit.

16. The control method according to claim 15, wherein the first processing buffer module comprises a first demultiplexing module, a first buffer module, a second buffer module, and a first image processing module; and the controlling the first processing buffer module to sequentially store and perform image processing on the first target signal and the third output signal comprises:

controlling the first demultiplexing module to store the first output signal into the first buffer module and to store the second output signal into the second buffer module;

controlling the second buffer module to store the third output signal; and controlling the first image processing module to perform image processing on the first output signal stored in the first buffer module, so as to improve signal quality of the first output signal, and to perform image processing on the second output signal and the third output signal that are stored in the second buffer module, so as to improve signal quality of the second output signal and the third output signal.

17. The control method according to claim 15, wherein in a case that the white pixel circuit comprises a plurality of white pixel sub-circuits and the color pixel circuit comprises a plurality of color pixel sub-circuits, the pixel circuit row comprises the color pixel sub-circuit or comprises the white pixel sub-circuit and the color pixel sub-circuit, and the pixel circuit column comprises the color pixel sub-circuit or comprises the white pixel sub-circuit and the color pixel sub-circuit; and the pixel signal processing module comprises a second processing module and a second processing buffer module, the second processing buffer module comprising a second demultiplexing module, a third buffer module, a fourth buffer module, and a second image processing module; and the control method further comprises:

controlling the second processing module to perform amplification processing on an output signal of the output signal line and to perform analog-to-digital conversion processing on an output signal of the output signal line that is obtained after amplification processing;

controlling the second demultiplexing module to store a fourth output signal into the third buffer module and to store a fifth output signal into the fourth buffer module;

controlling the fourth buffer module to store a sixth output signal of a second target processing module; and controlling the second image processing module to perform image processing on the fourth output signal stored in the third buffer module, so as to improve signal quality of the fourth output signal, and to perform image processing on the fifth output signal and the sixth output signal that are stored in the fourth buffer module, so as to improve signal quality of the fifth output signal and the sixth output signal; wherein the fourth output signal is a signal of a white pixel sub-circuit output from an output signal line corresponding to a first target pixel circuit column, the first target pixel circuit column being a pixel circuit column that comprises the white pixel sub-circuit and the color pixel sub-circuit; the fifth output signal is a signal of a color pixel sub-circuit output from the output signal line corresponding to the first target pixel circuit column; and the second target processing module is a second processing module connected to an output signal line corresponding to a second target pixel circuit column, the second target pixel circuit column being a pixel circuit column that comprises the color pixel sub-circuit.

18. The control method according to claim 17, wherein the second processing buffer module further comprises a signal synthesis module;

the control method further comprises:

controlling the signal synthesis module to fuse an output signal of a first target buffer module with an output signal of a second target buffer module, the first target buffer module and the second target buffer module being third buffer modules storing signals of two white pixel sub-circuits in adjacent rows of a target pixel cluster circuit, respectively; and the control method further comprises:

controlling the second image processing module to fuse an output signal of the signal synthesis module with a second target signal, so as to enhance the second target signal, the second target signal being a signal of a color pixel sub-circuit of the target pixel cluster circuit.

* * * * *